(12) United States Patent
Boegli

(10) Patent No.: US 9,579,924 B2
(45) Date of Patent: Feb. 28, 2017

(54) METHOD FOR MANUFACTURING A SET OF EMBOSSING ROLLERS

(71) Applicant: BOEGLI-GRAVURES S.A., Marin-Epagnier (CH)

(72) Inventor: Charles Boegli, Marin-Epagnier (CH)

(73) Assignee: Boegli-Gravures S.A., Marin-Epagnier (CH)

( * ) Notice: Subject to any disclaimer, the term of this patent is extended or adjusted under 35 U.S.C. 154(b) by 0 days.

(21) Appl. No.: 14/394,772

(22) PCT Filed: Mar. 22, 2013

(86) PCT No.: PCT/EP2013/056144
§ 371 (c)(1),
(2) Date: Oct. 16, 2014

(87) PCT Pub. No.: WO2013/156256
PCT Pub. Date: Oct. 24, 2013

(65) Prior Publication Data
US 2015/0059599 A1 Mar. 5, 2015

(30) Foreign Application Priority Data

Apr. 17, 2012 (EP) .................................... 12164380
Sep. 7, 2012 (EP) .................................... 12183455

(51) Int. Cl.
B44B 5/00 (2006.01)
B44B 5/02 (2006.01)
(Continued)

(52) U.S. Cl.
CPC ............ *B44B 5/026* (2013.01); *B23K 26/362* (2013.01); *B31F 1/07* (2013.01); *B65B 19/228* (2013.01);
(Continued)

(58) Field of Classification Search
CPC ... B65H 2301/5126; B31F 1/07; B44B 5/026; B23K 26/365; B29C 59/02; B41F 1/20
See application file for complete search history.

(56) References Cited

U.S. PATENT DOCUMENTS 5,269,983 A   12/1993  Schulz
5,281,511 A *  1/1994  Gerhardt ................. B41C 1/182
                                                          101/28

(Continued)

FOREIGN PATENT DOCUMENTS

CN        101186125 A    5/2008
DE   10 2005 056627 A1   8/1984

(Continued)

OTHER PUBLICATIONS

International Search Report and Written Opinion mailed Jul. 19, 2013 in PCT/EP2013/056144 (9 pgs.).

(Continued)

*Primary Examiner* — David Banh
(74) *Attorney, Agent, or Firm* — Foley & Lardner LLP

(57) ABSTRACT

In the method for manufacturing embossing rollers for a device for embossing packaging materials that comprises a set of at least two embossing rollers of which one is driven, and whereby the embossing roller set comprises a male roller having a male surface structure including structural elements and/or logo structures and a female roller having a female surface structure that is associated to the surface structure of the male roller for the common embossing operation with the male roller, the female surface structure is produced independently of a previously produced or physically pre-existing associated male surface structure. Along with a high embossing accuracy, this allows creating a very large variety of embossing structures, on one hand, and using a very large number of the most diverse materials, (Continued)

on the other hand, as well as reducing transverse tensions in the embossed material.

25 Claims, 24 Drawing Sheets

(51) Int. Cl.
    *B31F 1/07* (2006.01)
    *B65B 19/22* (2006.01)
    *B23K 26/36* (2014.01)
(52) U.S. Cl.
    CPC . *B31F 2201/072* (2013.01); *B31F 2201/0733* (2013.01); *B31F 2201/0741* (2013.01)

(56) References Cited

U.S. PATENT DOCUMENTS

| | | | | |
|---|---|---|---|---|
| 5,759,473 | A * | 6/1998 | Minke | B29C 33/405 219/121.61 |
| 6,176,819 | B1 * | 1/2001 | Boegli et al. | 493/355 |
| 6,665,998 | B1 * | 12/2003 | Boegli | 53/131.4 |
| 6,718,871 | B1 * | 4/2004 | Fritz | G06K 15/02 101/171 |
| 2002/0142143 | A1 * | 10/2002 | Schulz | B31F 1/07 428/195.1 |
| 2004/0055694 | A1 * | 3/2004 | Kershaw et al. | 156/209 |
| 2005/0279147 | A1 * | 12/2005 | Boegli | 72/196 |
| 2007/0289701 | A1 * | 12/2007 | Boegli | 156/209 |
| 2008/0116610 | A1 * | 5/2008 | Boegli | 264/284 |
| 2008/0136065 | A1 * | 6/2008 | Ohlinger | B23K 26/36 264/482 |
| 2008/0218817 | A1 * | 9/2008 | Grygier | G03H 1/028 359/9 |
| 2008/0236773 | A1 * | 10/2008 | Gelli et al. | 162/123 |
| 2008/0264275 | A1 * | 10/2008 | Wilhelm | B31F 1/07 100/210 |
| 2009/0050001 | A1 * | 2/2009 | Boegli | 101/6 |
| 2010/0018419 | A1 * | 1/2010 | Whitelaw | B41F 5/18 101/248 |
| 2011/0107804 | A1 * | 5/2011 | Boegli | 72/39 |
| 2012/0064298 | A1 * | 3/2012 | Orr et al. | 428/156 |
| 2012/0243094 | A1 * | 9/2012 | Boegli | B23K 26/0084 359/567 |
| 2012/0282436 | A1 * | 11/2012 | Coe et al. | 428/131 |
| 2013/0069276 | A1 * | 3/2013 | Boegli | 264/293 |
| 2013/0143726 | A1 * | 6/2013 | Middlemas et al. | 493/340 |
| 2013/0273322 | A1 * | 10/2013 | Boegli | 428/156 |
| 2015/0027083 | A1 * | 1/2015 | Polloni et al. | 53/131.4 |

FOREIGN PATENT DOCUMENTS

| | | |
|---|---|---|
| DE | 4342737 A1 | 6/1995 |
| EP | 0114169 A1 | 8/1984 |
| EP | 1658965 A1 | 5/2006 |
| EP | 2027994 A2 | 2/2009 |
| EP | 2327502 A1 | 6/2011 |
| WO | WO 2010/010580 A2 | 1/2010 |

OTHER PUBLICATIONS

Office Action mailed Mar. 22, 2016 in CN2013800207138 with English-language translation (31 pgs.).

* cited by examiner

FIG. 5
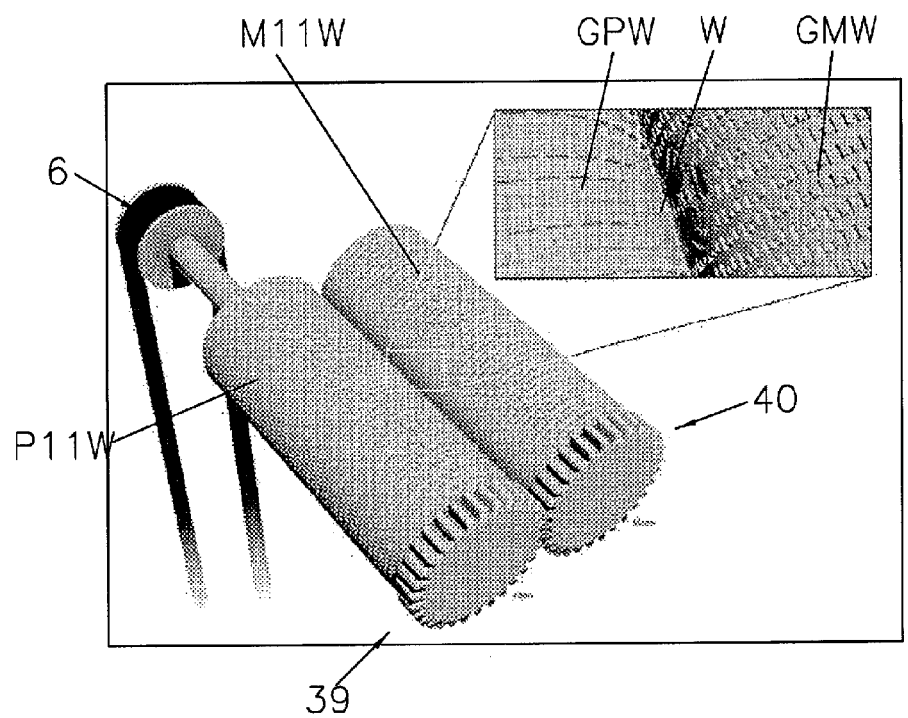
FIG. 6A
FIG. 6B
FIG. 6C
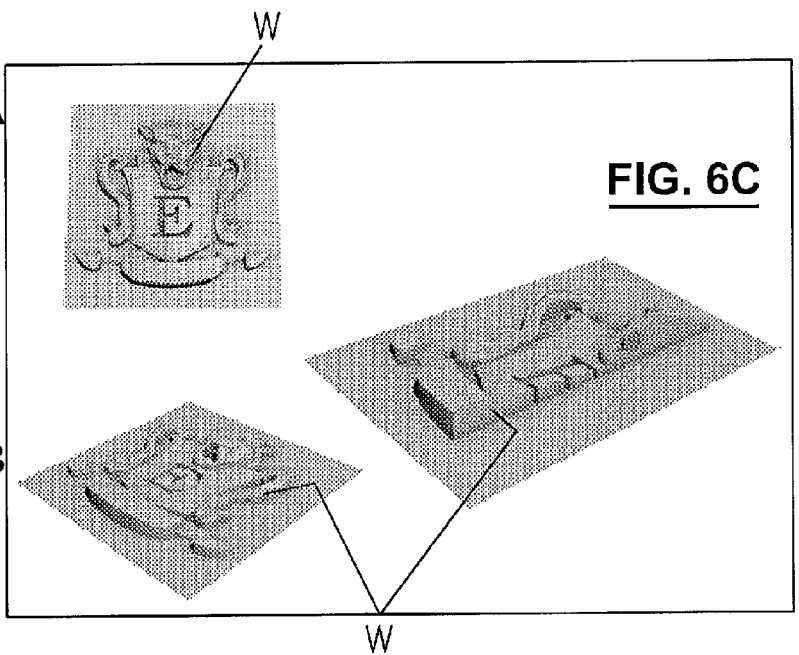

METHOD FOR MANUFACTURING A SET OF EMBOSSING ROLLERS

CROSS-REFERENCE TO RELATED APPLICATIONS

This application is a national stage entry of International Application No. PCT/EP2013/056144 filed Mar. 22, 2013, which claims priority to European Application No. EP12164380.3 filed Apr. 17, 2014 and European Application No. EP12183455.0 filed Sep. 7, 2014. The disclosures of all prior applications are hereby incorporated by reference.

The present invention relates to a method for manufacturing a set of embossing rollers for a device for embossing packaging materials that has two rollers, according to the preamble of claim 1, and to a set of embossing rollers manufactured according to the aforementioned method, as well as to the use of these embossing rollers in a device for embossing packaging materials.

Packaging foils for the tobacco industry or the food industry have been embossed by means of embossing roller devices for some time already, the foils being e.g. so-called inner liners that are wrapped around a number of cigarettes, or packaging materials for chocolate, butter, or similar foods, electronic components, jewelry, or watches.

Originally, the so-called inner liners consisted of pure aluminum foils like e.g. household foils, and embossing was achieved by passing them between two rollers of which at least one was provided with a relief, the so-called logos. Until about 1980, such a roller pair mostly consisted of a steel roller on which a relief was formed and of a counter-roller of a resilient material, e.g. rubber, paper, or acrylic glass. By impressing the relief of the male roller into the counter-roller=female roller, the mirror-inverted impression was produced.

For more sophisticated logos, the relief of the male roller was transferred to a layer on the female roller and the indentations corresponding to the raised portions were etched out or otherwise carved out. Recently, laser has also been used for this engraving process.

Since this manufacture of female rollers is demanding, after about 1980, when U.S. Pat. No. 5,007,271 to the applicant of the present invention was filed, a so-called pin-up/pin-up system has increasingly been used where two identical steel rollers having a very large number of small teeth interlock and emboss the paper passing therethrough. Logos are produced by partly or entirely removing teeth on one roller.

Furthermore it was thus possible to produce the so-called satinizing where a matt and thus also more precious appearance of the surface is produced by the large number of small indentations created by the teeth.

EP 0 114 169 1 discloses an embossing device which is situated after a printing device and which has a male metal embossing roller and a female counter roller made of resilient material, whereby the depressions in the female roller are bigger then the elevations on the male roller. This device is not foreseen for embossing without previous printing. The method of manufacture ob both rollers is not disclosed apart from the fact that a laser can be used for the manufacturing of the depressions.

U.S. Pat. No. 5,269,983 A discloses also a pair of rollers with a metal male and a resilient female roller.

DE 10 2005 056627 A1 discloses a method and device for the production of blanks for an innerliners for a group of cigarettes, comprising a pair of embossing rollers, having elevations on one roller and corresponding depressions on the other roller. There is no disclosure as concerns the method of manufacture of the pair of rollers.

DE 43 42 737 A1 discloses a method and device for the production of embossed innerliner blanks with a pair of rollers, wherein one roller is provided with an engraving on a part of its circumference, whereas the counter roller is provided with an engraving on its whole circumference. There is no hint at the method of manufacture of the embossing rollers.

EP 2 327 502 A1 of the same applicant discloses a method and device for structuring embossing rollers by a laser device.

EP 1 658 965 A1 discloses an embossing device comprising two pairs of embossing rollers, one pair for satinizing a foil and a second pair for embossing graphics. The second pair of rollers can comprise a male roller and a resilient female roller, or rollers in the so-called pin up-pin down configuration. There is no disclosure of a method of manufacture of such rollers.

In parallel to the developments in the embossing techniques, i.e. in the manufacture of the embossing rollers, a change has also taken place with regard to the packaging materials in that the originally used all-metal aluminum foil was replaced by paper foils whose surfaces were coated for environmental considerations with increasingly thinner metal layers, the latter having lately been applied by sputtering. In recent times, the metal layer on the inner liners has been further reduced and will eventually be omitted altogether in the future.

At the same time, attempts are being made to replace the classical packaging system, where the cigarettes are packaged in innerliners and this package is inserted into a paperboard packet, by so-called soft packs where only a wrapping foil is provided that simultaneously fulfills the functions of keeping the cigarettes moist and protecting them against exterior olfactory influences, on one hand, and of providing a certain stiffness for the mechanical protection of the cigarettes, on the other hand.

The developments in the manufacture of the embossing rollers, particularly those made known by the applicant of the present invention, see e.g. U.S. Pat. No. 7,036,347, have led to an ever increasing scope of decorative effects on the innerliners and to a larger diversity of advertisements that has not only been utilized in the cigarette industry but also in the food industry. Lately, however, efforts are being made to strongly restrict or completely eliminate advertising for tobacco products so that it will no longer be possible to emboss the innerliners with promotionally effective designs to the former extent. Therefore, possibilities are being sought for producing new decorative effects without using eye-catching embossings, gold rims or decorations of the kind.

Also being considered are new possibilities for product identification, which has mainly been ensured in internationally established brand names so far. Today, so-called tactile effects are being used which are created by special surface structures of the papers or by special engravings. Both textiles and papers are provided with expandable IR absorption optimized colors which create so-called pseudo-embossings. The purpose of this technique may be a perceptible relief formation e.g. for creating a velvety surface or a matte effect. In applications for food safe purposes, however, wetting techniques are questionable.

In the case of tactile surfaces, the consumer identifies the product by means of his or her tactile sense. Furthermore, this can lead to Braille writings or for producing hidden security features. Information produced in a tactile manner may e.g. be read out by means of laser radiation based on the surface-dependent reflectance. Furthermore, recent developments aim to produce audible effects that are produced by rubbing over the surface.

Another sector of the tobacco industry is concerned with the cigarette itself, e.g. with its mouthpiece, also called the tip.

As a result of the ever more restrictive legislation on tobacco products and of the strive for further features such as tactile, acoustic, or different optical features, on one hand, and of the continually increasing diversity of different packaging materials such as aluminum foils, metal coated papers, tipping papers, hybrid foils, plastic foils, paperboard, or cardstock, on the other hand, the conventional pin-up/pin-up embossing rollers where both the driven roller and the counter-rollers have a large number of teeth are still wholly and successfully utilizable for embossing inner liners but reach their limits with regard to the aforementioned purposes.

Although known roller systems comprising a male roller having male structures and a female roller having female structures that are inversely congruent thereto may extend the scope of decorative elements, their production is very cost-intensive and above all time-consuming due to the pairwise and matched manufacture so that their manufacture for the industrial embossing of e.g. metallized inner liners for the tobacco industry is not adequate.

Moreover, fine embossing can only be ensured with a very expensive manufacture of such rollers. In addition, when a male roller and an inversely congruent female roller are used in this context, the foil therebetween will be crushed to such an extent that tensions arise in the transversal direction that are unacceptable for tobacco product papers. Moreover a hardly controllable limit to perforation is reached and very high pressures are required for a high speed on-line process while the embossing times are in the millisecond range. Ultimately there is a tendency to use thicker papers.

One object of the invention that arises from the preceding is to provide a method for manufacturing a set of embossing rollers that allows fine embossing of the described, most diverse surface structures of the indicated materials of the most diverse kinds in an on-line process in a packing line. In this context, the term "fine embossing" means that the contours of the fine embossing structures of the rollers exhibit an overall linear error of less than +/−10 µm and an angular error of less than 5°. This object is achieved by the method according to claim 1.

Another object of the invention is to keep deformations of the embossed foils during the embossing of regularly arranged and uniform structures transversally to the running direction so small that the rollers can be used in an on-line process in a packing line. This object is achieved by the method according to claim 6.

Another object is to produce such a set of rollers on an industrial scale in the required precision and numbers. This object is achieved by the method according to claim 10. Further objects and advantages, such as the manufacture of roller pairs for producing creasings, become apparent from the dependent claims and the following description.

The invention will be explained in more detail hereinafter with reference to drawings of exemplary embodiments.

FIG. 1 schematically shows a set of embossing rollers of the pin-up/pin-up type according to the prior art in an embossing device, both rollers having teeth that project from the cylinder, FIG. 2 schematically shows a set of embossing rollers of the pin-up/pin-down type according to the prior art, the female roller=pin-down roller being designed inversely congruent to the male roller pin-up roller.

FIG. 3 schematically shows a set of embossing rollers of the male-female roller type according to the invention, FIG. 4 shows an embodiment variant of the set of embossing rollers of FIG. 3, FIG. 5 shows a further embodiment variant of the set of embossing rollers of FIG. 3, FIG. 6 shows three different enlarged views of a detail of the male roller of the embossing set of FIG. 5, FIG. 7 shows an embodiment variant of the set of embossing rollers of FIG. 5, FIG. 8 shows a further embodiment variant of the set of embossing rollers of FIG. 3, structures of male-female rollers according to the invention, FIGS. 10-16 show embodiment variants of structures on the embossing rollers according to FIG. 3, FIGS. 17-20B show schematic sectional views of embodiments of male and female structures that are not inversely congruent, FIGS. 21-35 show embodiment variants of roller pairs having zones for producing folding creases, FIG. 36 schematically shows a first exemplary embodiment of a quick-change device for the rollers according to the invention in a perspective view, FIG. 37 shows the assembled device of FIG. 21 in a sectional view, FIG. 38 schematically shows a second exemplary embodiment of a quick-change device for the rollers according to the invention in a perspective view, FIG. 39 schematically shows a third exemplary embodiment of a quick-change device for the rollers according to the invention in a perspective view, and FIG. 40 schematically shows a further exemplary embodiment of a quick-change device for the rollers according to the invention in a perspective view.

FIG. 1 shows an embossing device 1 according to the prior art with a set of two rollers 2 and 3 of the pin-up/pin-up type. In this configuration, the steel cylinders comprise projecting teeth 4 that are generally pyramidal and have an either square or rectangular base. In cigarette packing lines and other packing lines, such rollers by the applicant of the present invention have been used for over twenty years, the axle 5 of the driven roller 2 being fixedly supported whereas counter-roller 3 is driven and synchronized by the driven roller. In a known manner, such an embossing device may comprise more than two embossing rollers, e.g. one embossing roller and two counter-rollers.

In this case, axle 5 of counter-roller 3 is advantageously movable in all three dimensions such that one tooth of one roller may engage between four teeth of the other roller and a non-slipping self-synchronization is possible. In order to produce logos and authentication features, teeth of the driven roller are either completely or only partly removed, thereby creating an image that changes according to the angle of light incidence and on the viewing angle of the observer. Furthermore it is known to create authentication features on top or on the sides of the teeth by means of microengravings or alternatively to remove or modify certain teeth in a predetermined arrangement.

For producing authentication features or decorations on inner liners, i.e. on metal coated paper, the pin-up/pin-up rollers are very well suitable and have been successfully used for decades. As mentioned in the introduction, both the higher requirements with regard to the embossing precision and the adaptations to an ever growing diversity of packaging materials such as synthetic foils, hybrid foils, paperboard, or cardstock, and the expected more restrictive regulations on advertising and the new embossing types related thereto reveal the limits of pin-up/pin-up embossing roller devices.

Besides the devices using pin-up/pin-up rollers, i.e. two or multiple male rollers, embossings have also been carried out with male-female rollers or, as illustrated in FIG. 2, with so-called pin-up/pin-down roller pairs.

Device 7 according to FIG. 2 comprises two rollers 2 and 8 where male roller 2 may be the same as in FIG. 1 while female roller 8 is a so-called pin-down roller and indentations 9 correspond to teeth 4 on roller 2 in an inversely congruent manner. As in FIG. 1, roller 2 is driven by drive 6 while roller 8 is driven by teeth 4. In order to ensure a smooth embossing operation, the teeth and indentations have to be machined and adjusted to each other very precisely.

First male roller 2 is manufactured and brought into contact with a female roller steel cylinder in such a manner that the teeth of the male roller are reproduced on the female cylinder, and a photo lacquer or wax layer or the like is generally applied to the female cylinder. Subsequently, the indentations 9 in the female cylinder that correspond to teeth 4 are carved out, generally by etching. It is also known, however, to carve out the indentations on the female roller mechanically or by means of a laser system.

Based on these two general types of embossing rollers it is known to form, on their hard surfaces, a very large number of signs, images, letters or the like, generally referred to as "logos", as well as security features or authentication features that are often invisible by the naked eye and are readable by suitable optical apparatus.

Due to the very complex technology required for the manufacture of a male-female roller pair according to the prior art, the application of the latter for industrial purposes is very limited. Generally, such systems are made to specification or used for special purposes. Moreover, a conventional male-female roller system having inversely congruent structures suffers from the serious disadvantage, among others, that particularly after the embossing of row structures the foil will exhibit a distortion in the transverse direction that makes its subsequent processing in a packing line very difficult. In addition, the resulting transverse tensions may cause the foil to be perforated, thereby making it unsuitable for use in the food sector or in the tobacco industry.

Based on the foregoing description, a primary requirement for a substantial improvement of the embossing possibilities and quality and mainly also for an application in the on-line process is that the surface structures of the rollers, particularly of the female rollers, can be manufactured in a larger diversity as well as more rationally and in particular more precisely. Whereas the precision might be ensured according to the prior art by very expensive etching or mechanical machining procedures, this is not the case for the rational and thus also faster manufacture of the male-female rollers in a large diversity of surface structures.

Furthermore, another requirement consists in taking measures in order to reduce the transverse tensions in the embossed foil, which appear more frequently with inversely congruent structures, to such an extent that they do no longer impair the subsequent processing.

One solution consists in shaping the surface structures of the rollers of a set independently of each other rather than first shaping the male roller and then the female roller in a physically dependent relationship. Currently, this is preferably achievable with the required precision and within the required production time by means of a suitable laser system that allows manufacturing not only male rollers but also female rollers rationally, precisely, and above all in a large variety of shapes and independently of each other.

It has been recognized that the individual manufacture of male and female rollers allows to achieve a reduction of the transverse tensions due to the fact that the female structures are not inversely congruent, i.e. do not exactly correspond to the associated male structures. Due to the fact that the dimensions and shapes of the male structures, e.g. teeth, do not exactly correspond to those of the indentations in the female roller, not only the quality of the embossing is improved but also a sufficient reduction of the transverse tensions in the embossed foil is achieved.

Especially in the case of the embossing of two tipping webs on respective rollers, this may cause warping of the foil web that may have consequences particularly with regard to the cutting operation. According to WO-2011/098376 to the applicant of the present invention, which refers to pin-up/pin-up rollers exclusively, this problem may be solved in that the logo lines on the two tipping webs are arranged in mutually offset positions. The result is that no tensions are created when the tipping webs are being cut and that the tipping web portions can subsequently be glued around the cigarette mouthpiece without problems to form a tip where no seam is visible.

In the case of the male-female rollers according to the invention, this applies not only to the embossing of relatively narrow tipping webs but more generally to embossing structures arranged in rows.

FIG. 3 shows a schematized illustration of an embossing device 10 according to the invention comprising a male roller P11 and a female roller M11 as well as an enlarged illustration of their surface structures, where rhombic coarse structures GP1 and GM1 are depicted, see also FIGS. 10 to 16.

Since the coarse structures are not teeth, the driving force is transmitted from male roller P11 that is driven via belt drive 6 to female roller M11 by means of gearwheels 39 and 40.

In the embodiment variant of FIG. 4, the rollers P11E and M11E exhibit a coarse structure GPE and GME that consists of the capital letter "E".

In the embodiment variant of FIG. 5, the rollers P11W and M11W exhibit the same coarse structure GPE and GME that consists of the capital letter "E" as well as an emblem W. In FIG. 6, this emblem W on male roller P11W is shown in different views: in FIG. 6A in a top view, in FIG. 6B in a perspective view, and in FIG. 6C in a sectional view.

Figure 9:
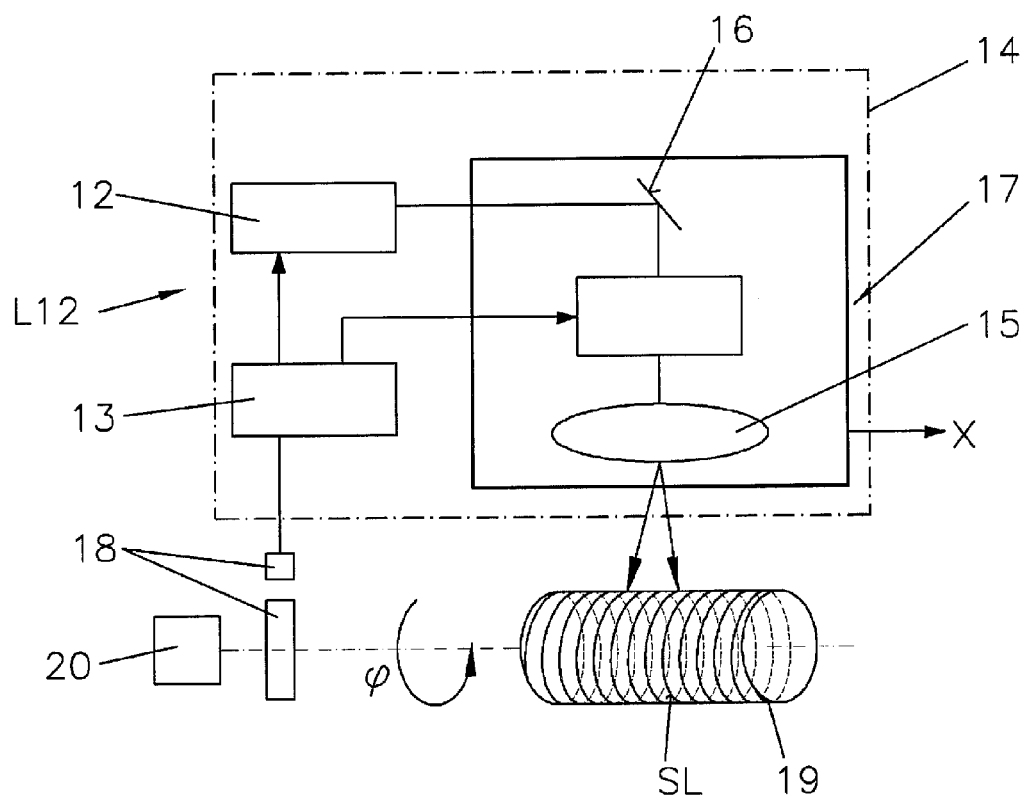

In FIG. 9 an exemplary laser system is schematically illustrated which allows producing the coarse and fine structures shown in FIGS. 10-16 that are suitable for a continuous fine engraving=macrostructuring process. The depicted laser device L12 comprises a laser 12 that is connected to a control circuit 13 that controls laser 12 and a deflection unit 14 which may comprise beam splitters as well as acousto-optical or electro-optical modulators or polygon mirrors. Deflection unit 14, focusing optics 15, and deflection mirror 16 form engraving unit 17 that is linearly displaceable in the X axis as symbolically indicated by the X arrow. Alternatively, the entire laser device L1 may be displaceable in the X axis.

Control circuit 13 is connected to a position detector 18 for detecting and evaluating the data of the rotating workpiece 22, in this case an embossing roller blank. The workpiece is driven by a drive 23, which is symbolized by rotation angle φ. By the combination of the linear displacement of the engraving unit and of the rotation of the roller a constant helical line SL is created that allows a uniform machining.

The application of a deflection unit that may e.g. comprise one or multiple beam splitter(s) as well as electro-optical or acousto-optical modulators or one or multiple polygon mirror(s) allows splitting the initial laser beam into two or multiple laser beams impinging on two or multiple tracks simultaneously but at such a mutual distance that they do not interfere. Moreover, the time interval between the impingement of the individual pulses can be chosen large enough to avoid a thermal overload.

By the application of short pulse lasers whose laser pulses are comprised between 10 femtoseconds and 100 picoseconds, the energy is applied in a very short time period so that a so-called "cold ablation" becomes possible where the material is evaporated very quickly without unacceptable heating of the adjacent material. The undesirable liquid state of the material that produces crater edges and splashes can thus be almost completely avoided. The desired structures are generated on a computer that controls the laser system so that it is of no importance whether a surface structure for a male roller or for a female roller is produced. For the rollers, i.e. their surface, e.g. a suitable steel, hard metal, or ceramic material is used.

Figure 1:
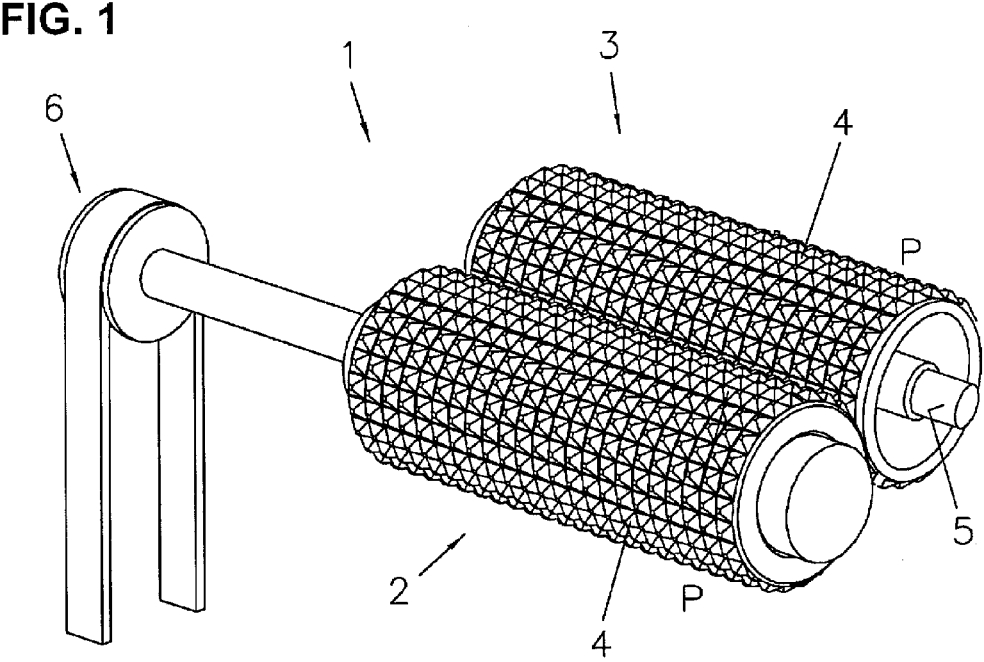
Figure 2:
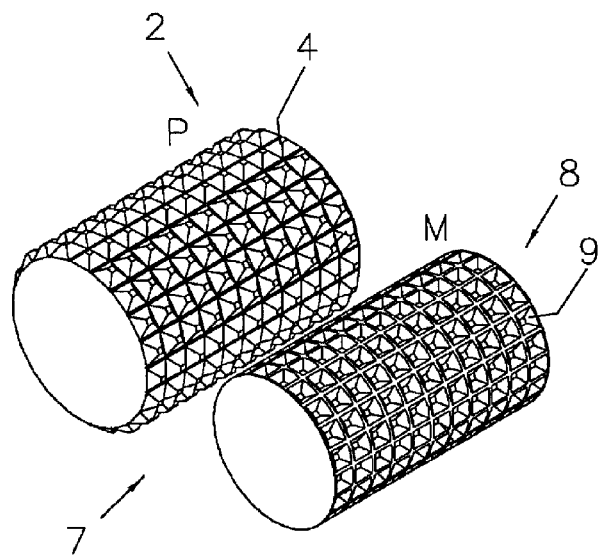
Figure 3:
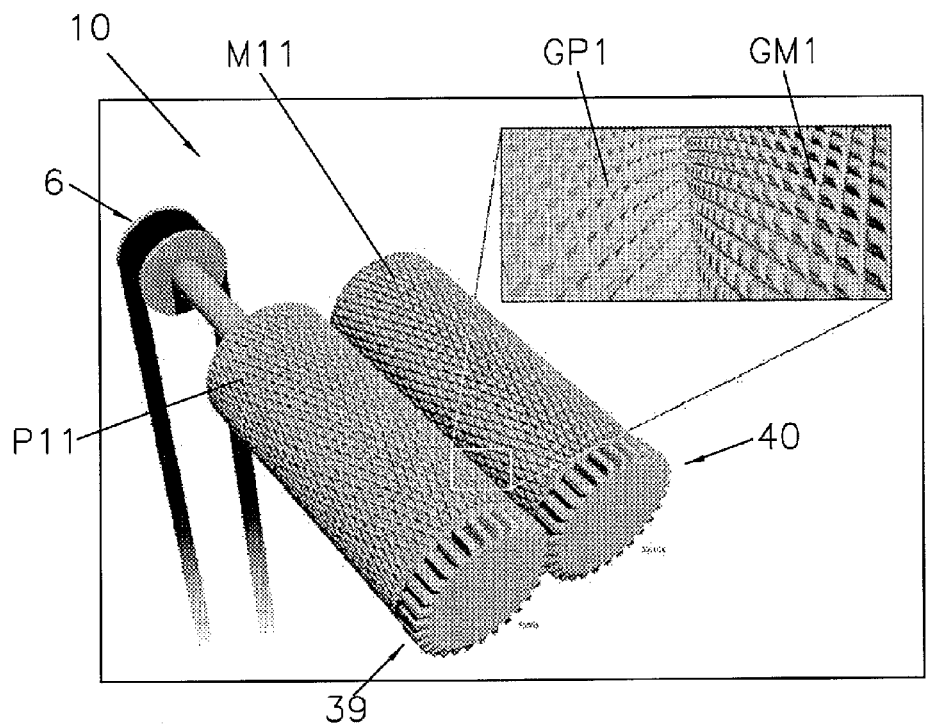
Figure 4:
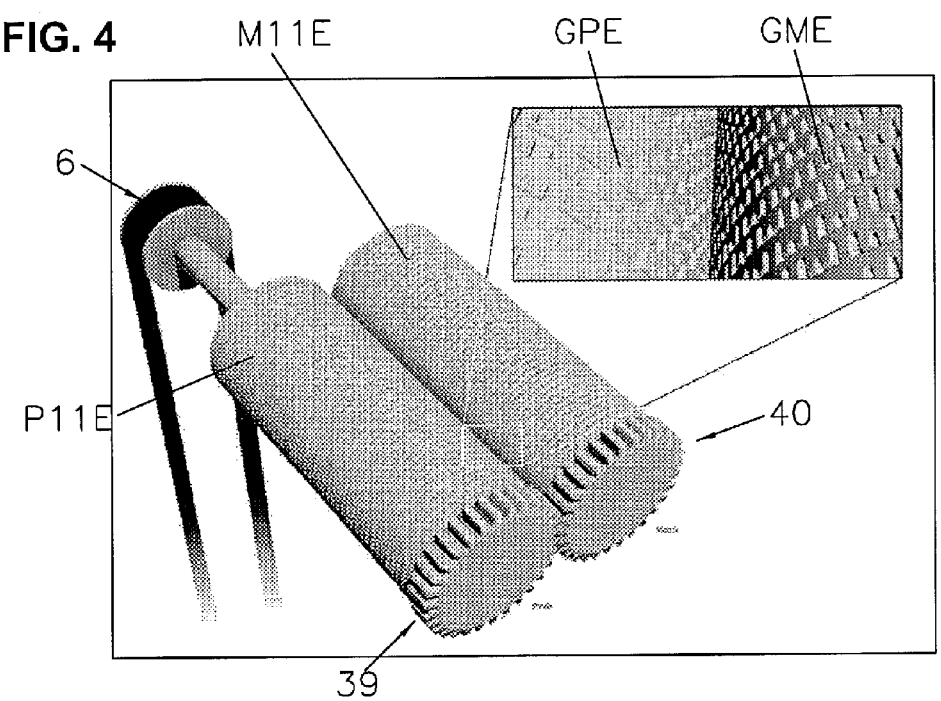
Figure 7:
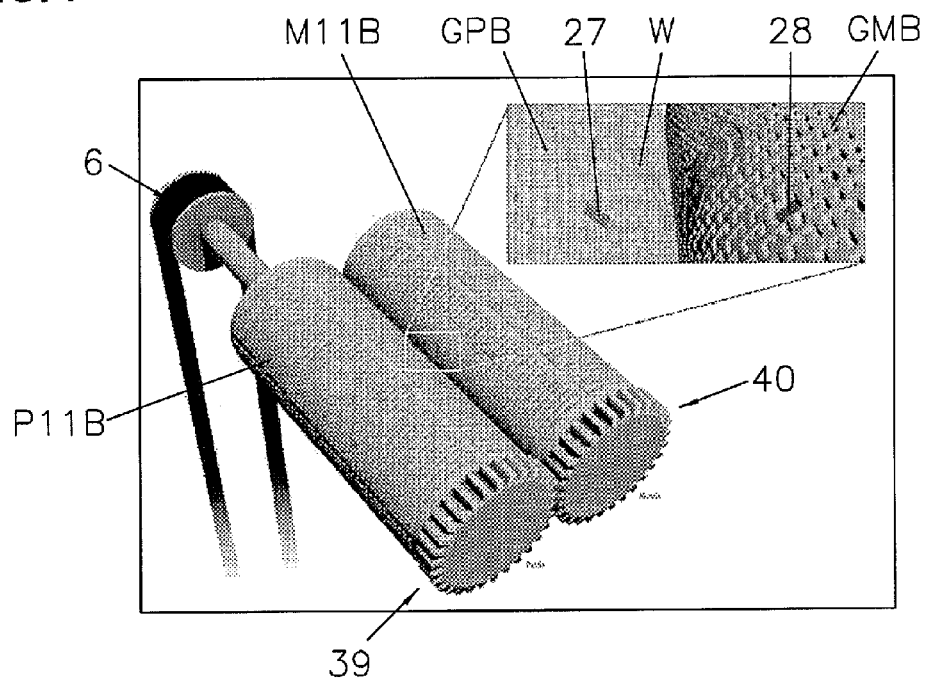
FIG. 7 shows an embodiment variant of the roller pair of FIG. 5 where the two rollers P11B and M11B are provided in addition to the "E" shapes and emblem W with positioning marks 27 and 28 allowing to synchronize the rollers and the embossed material by means of a camera.
Figure 8:
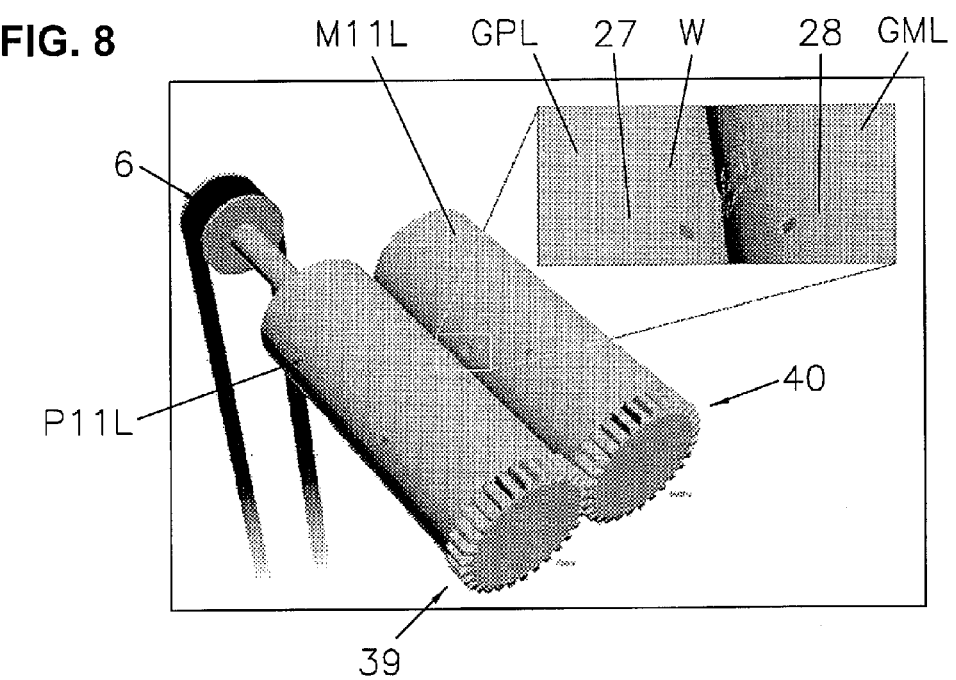
FIG. 8 shows a pair of embossing rollers P11L and M11L having no structures except the emblem and which are also provided with marks 27 and 28.

In FIGS. 10-16, a few structures among the very large diversity of possible surface structures are illustrated. In each of these Figures, coarse structures GP1 and GM1 are the same as illustrated in FIG. 3 whereas the superposed fine structures vary. The depicted rhombi 21 of the coarse structures comprise male ridges 22P and female grooves 22M. Exemplary dimensions are a longitudinal diagonal of 4 to 6 mm, more particularly 4.6 mm, and a transverse diagonal of 1.5 mm to 3 mm, more particularly 2.0 mm, whereas the width of the ridges and grooves 22 is equal to approximately 0.2 mm. In the enlarged views, the female structure is shown on the left of the drawings and the male structure on the right and the structures are illuminated from the bottom left.

Figure 10:
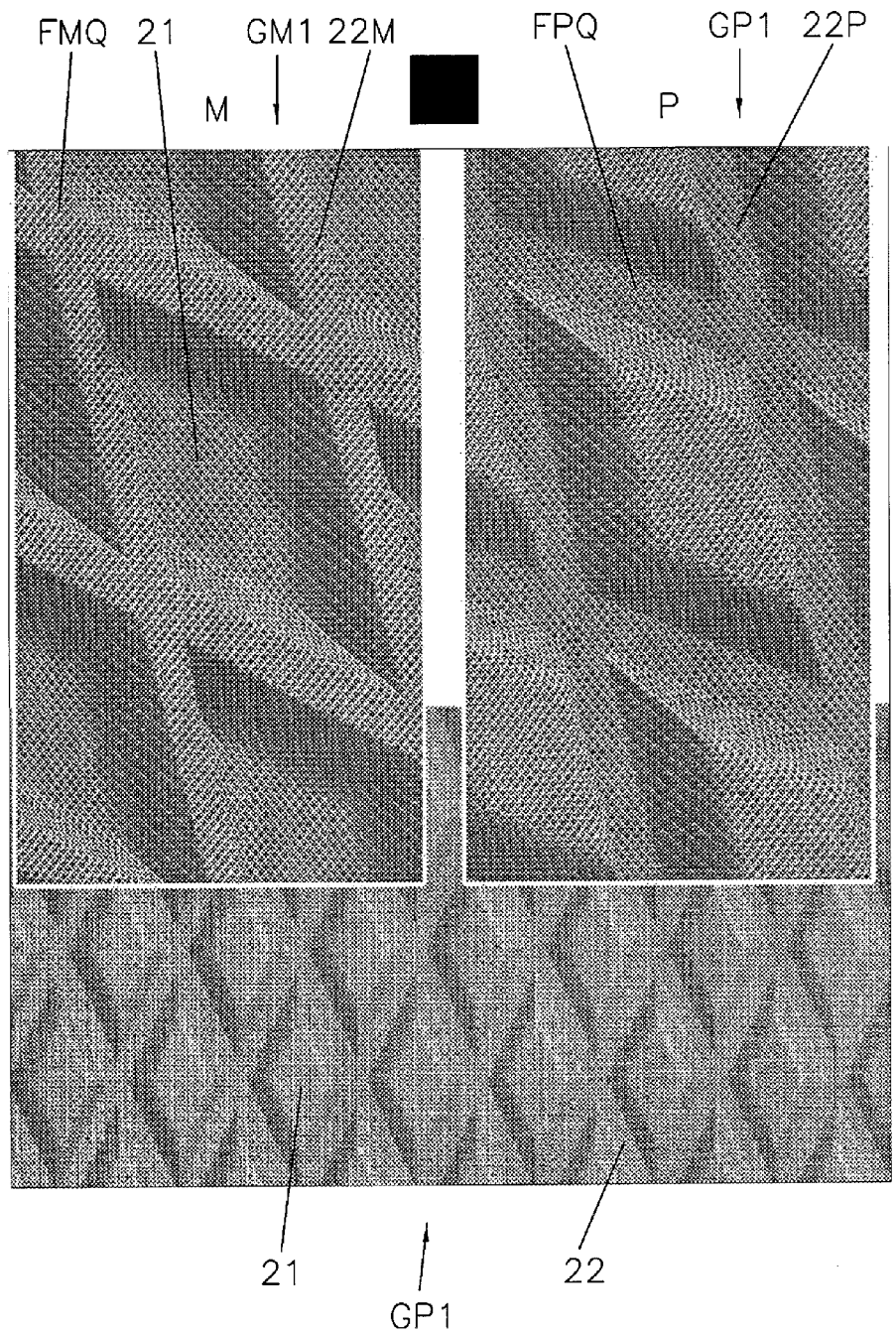

As appears particularly in the enlarged views, respective fine structures FP and FM are superimposed on coarse structures GP1 and GM1, the fine structures varying in their shapes. In FIG. 10, the fine structure FPQ consists of squares. The pitch of the squares, i.e. their recurrent spacing, amounts to about 0.04 mm. As will be apparent in FIGS. 17-20, the male and female structures are not exactly inversely congruent but their shapes and dimensions differ from each other by a certain amount.

Figure 11:
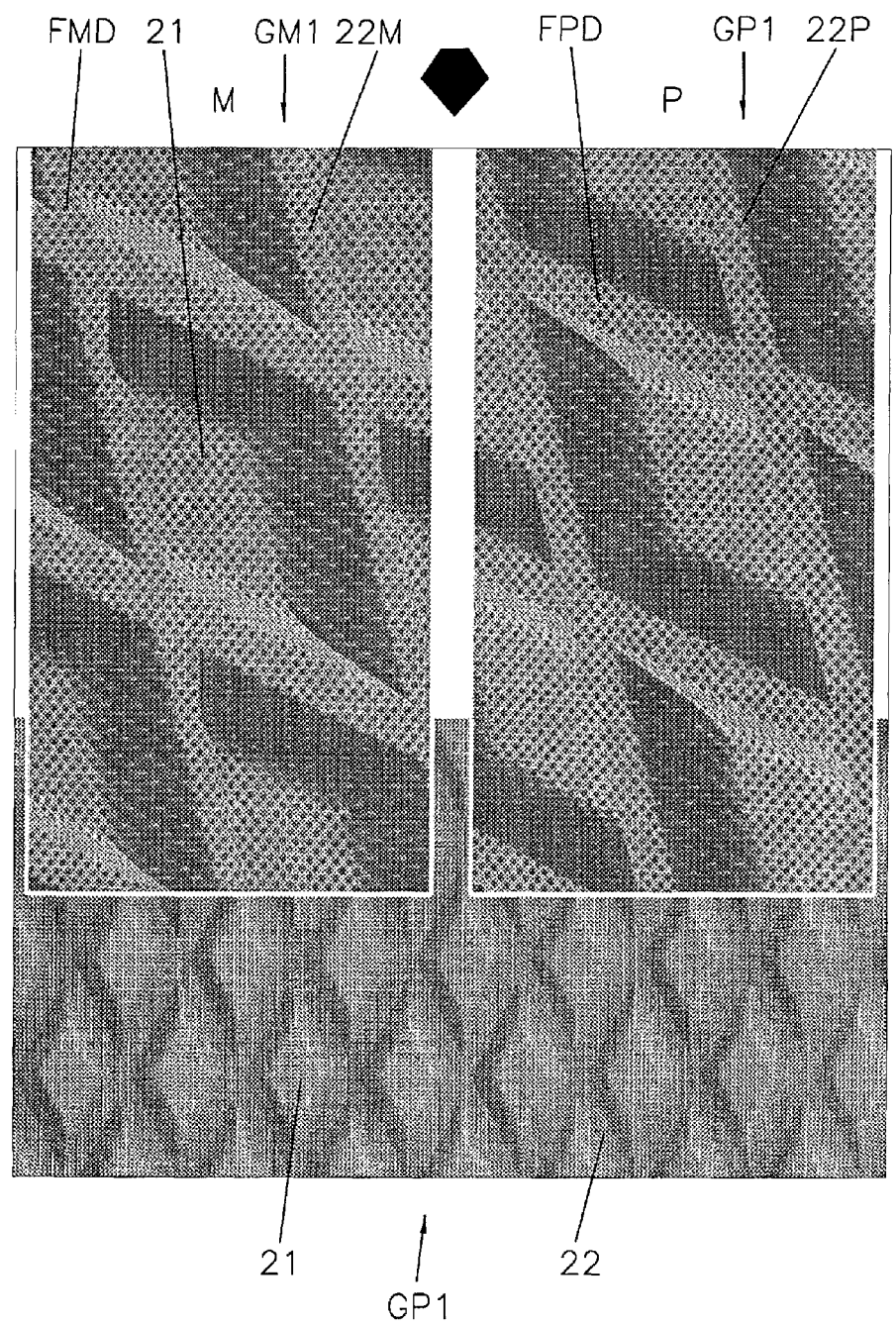

In FIG. 11, the fine structure FPD and FMD is diamond-shaped instead of square. The dimensions in FIG. 11 are slightly larger than in FIG. 10, i.e. the pitch of the fine structuring is 0.07 mm here while it is understood that it may be smaller, e.g. 0.05 mm, or larger.

Figure 12:
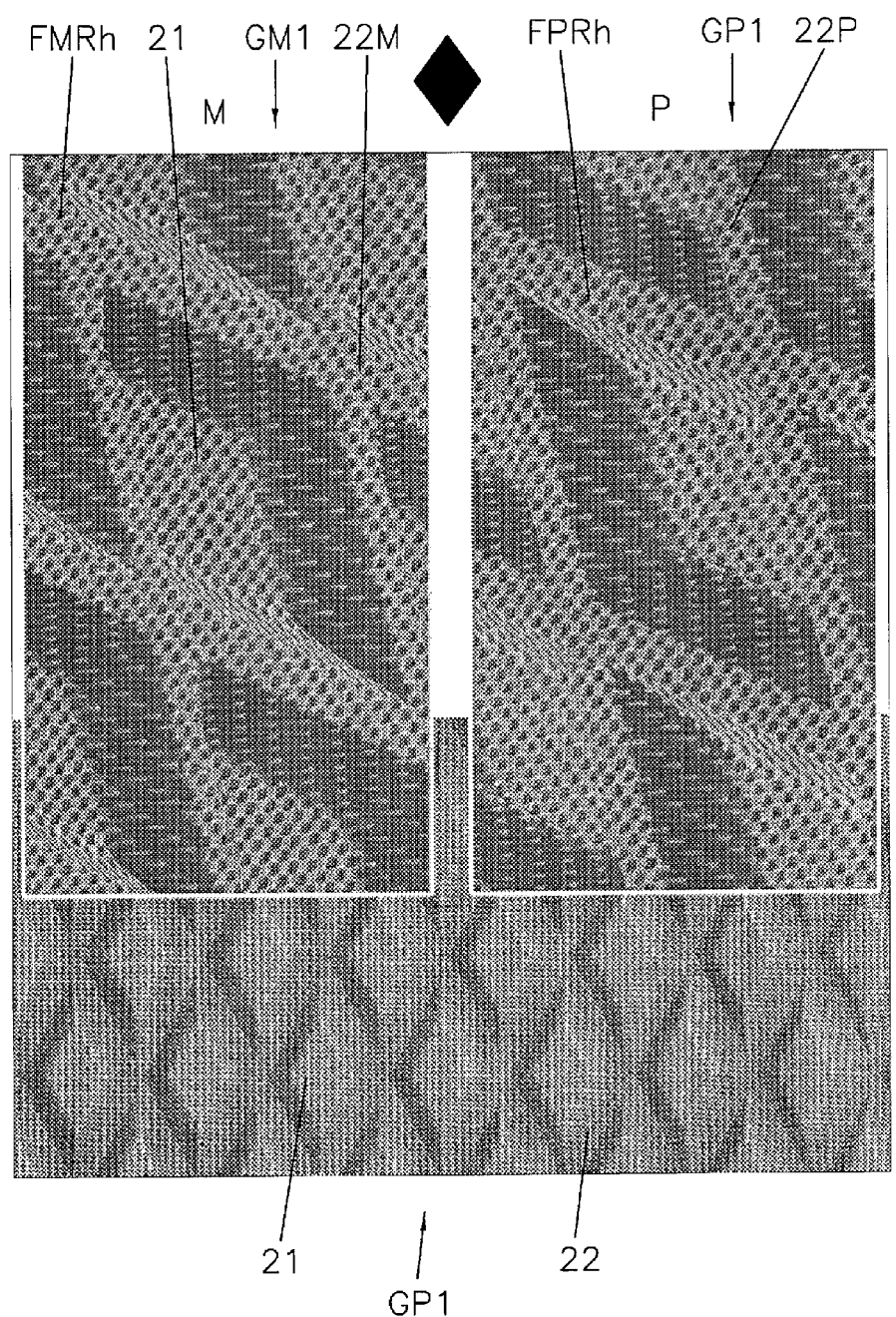

In FIG. 12, the fine structure FPRh and FMRh is rhombic. Here also the dimensions are the same as previously.

Figure 13:
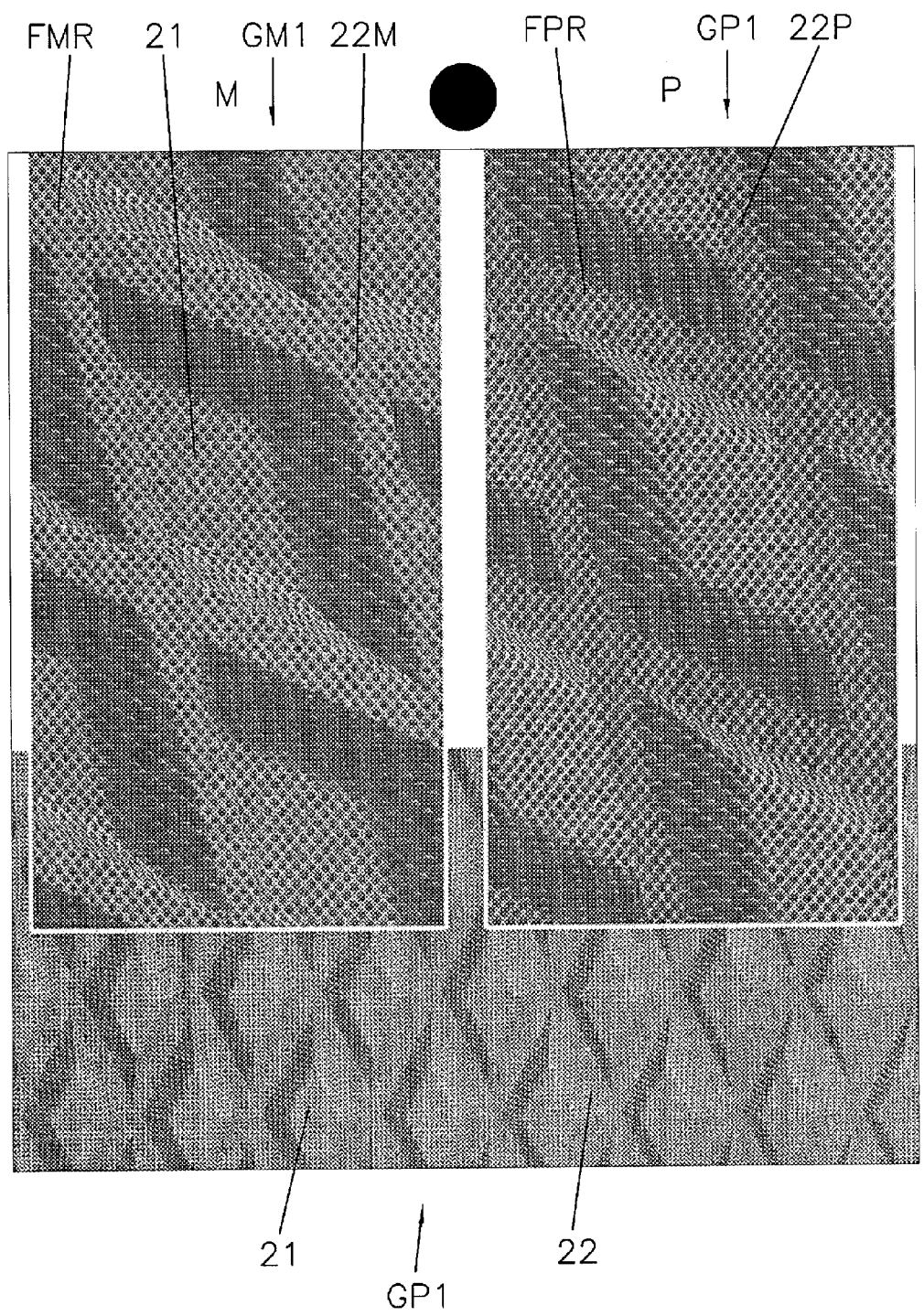

In FIG. 13 the fine structure FPR and FMR is round. Here also the pitch of the fine structure may amount to 0.07 mm.

Figure 14:
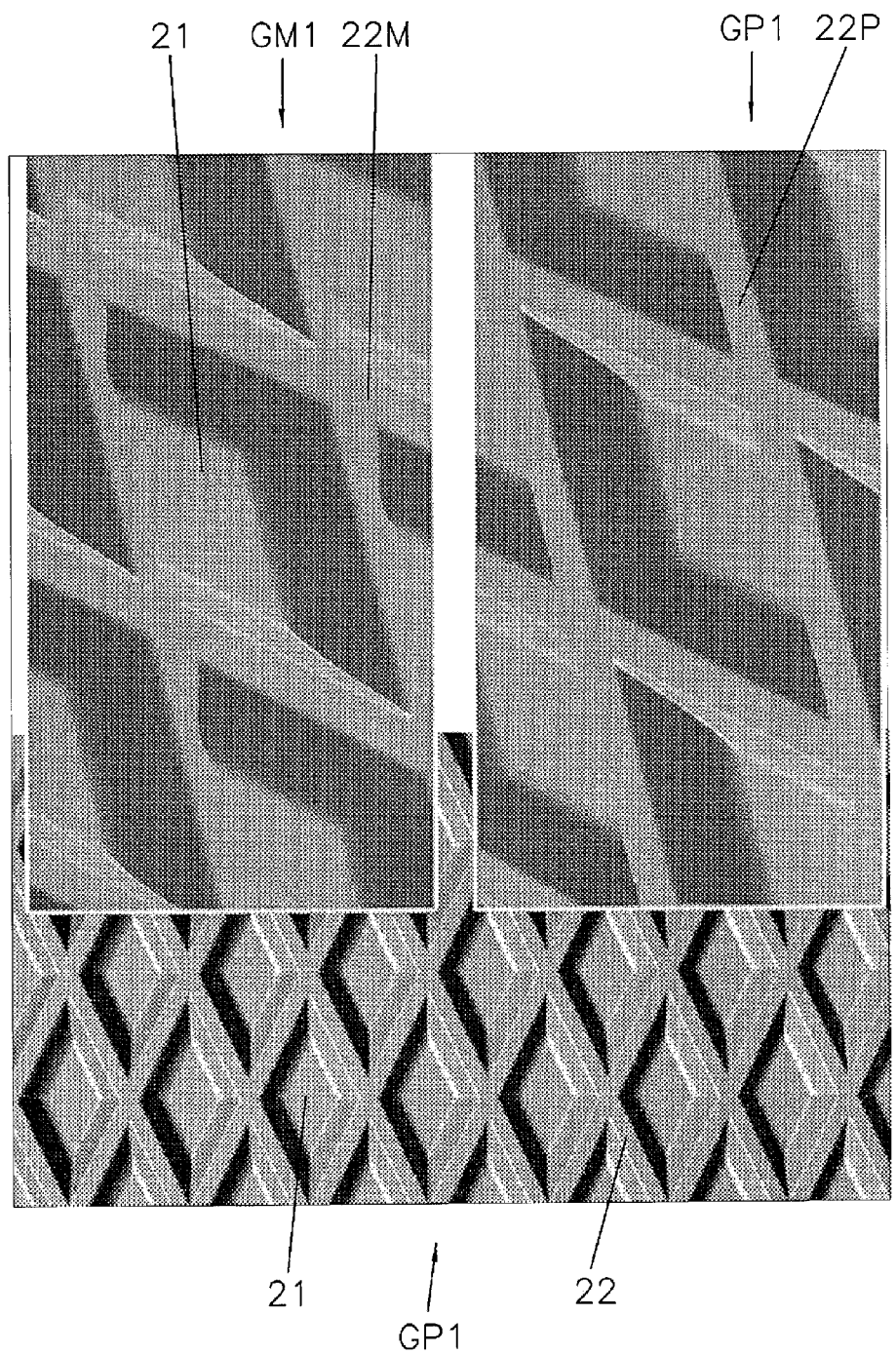

In FIG. 14 only coarse structure GP1 and GM1 is shown, without any fine structures. Such a structure is particularly suitable for producing tactile structures that are not only well perceptible but also have an esthetically pleasing appearance. In this manner, e.g. signs in Braille or acoustically utilizable structures may be produced.

Figure 15:
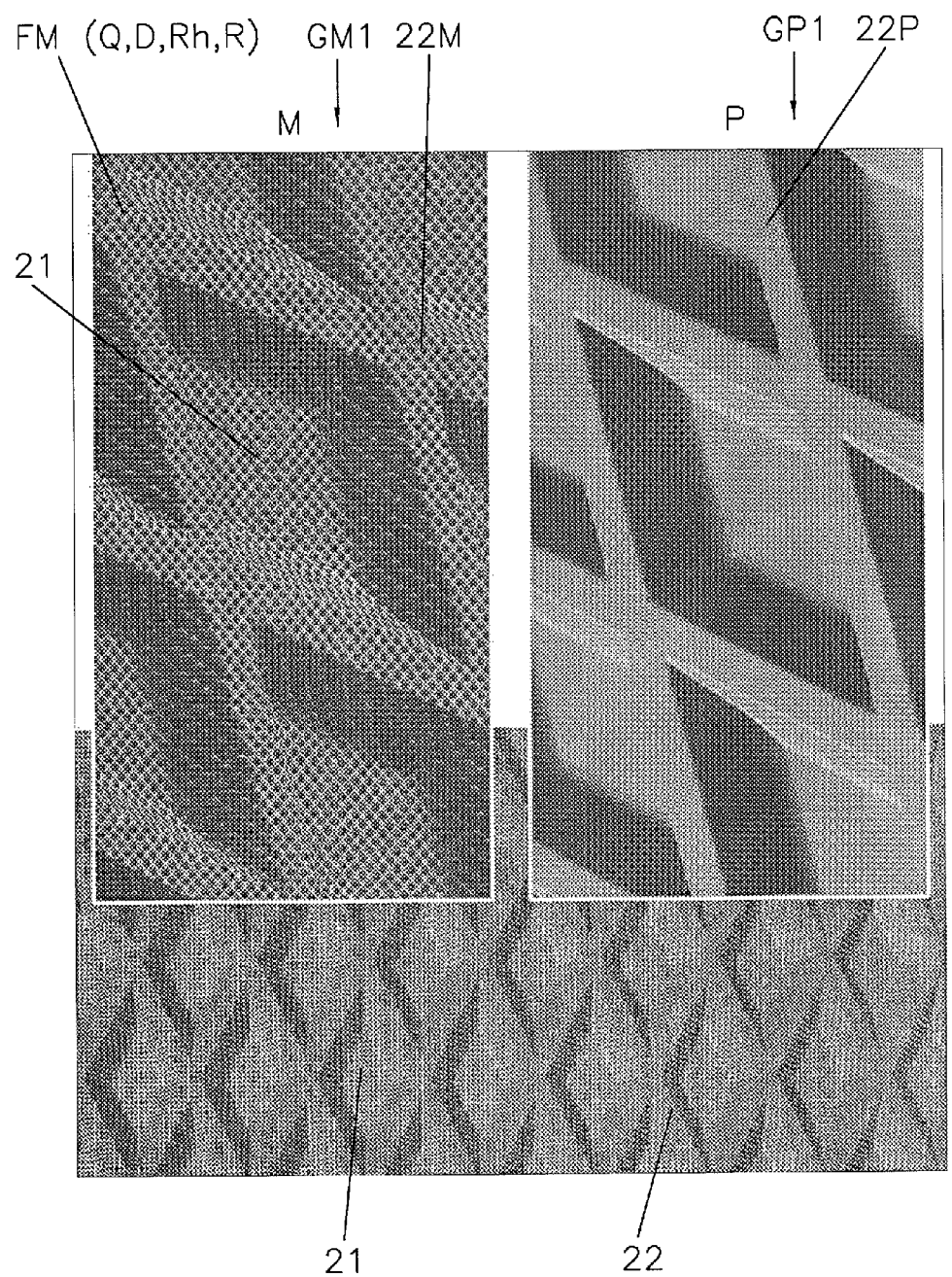

In FIG. 15 it is illustrated that no fine structure is superposed on male coarse structure GP1 whereas a fine structure FM (Q,D,Rh,R) is superposed on female coarse structure GM1 that is square, diamond-shaped, rhombic or round, as shown above, or may include an emblem as according to FIG. 5 or another decoration of the kind.

Figure 16:
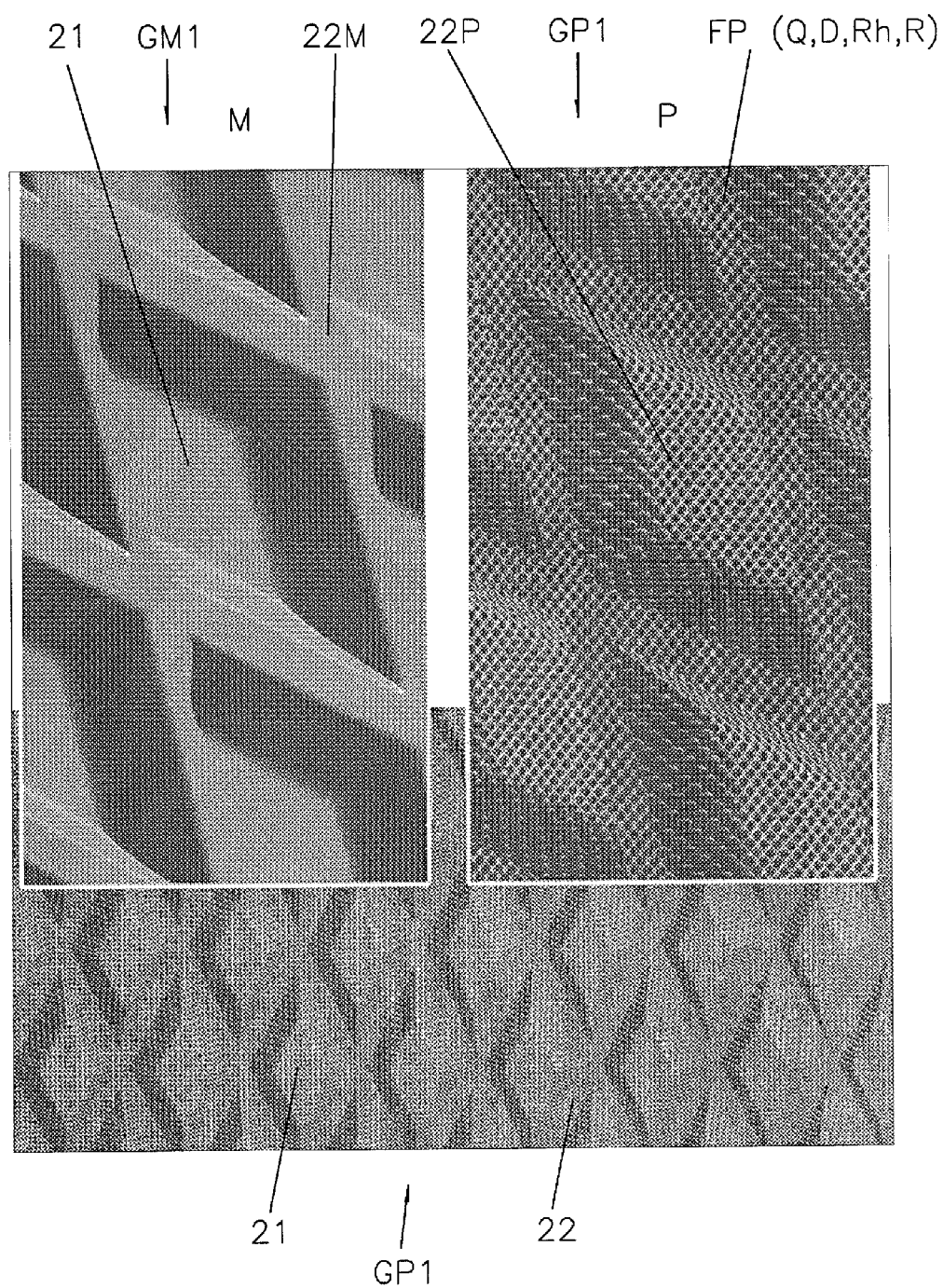

In FIG. 16 it is illustrated that a fine structure FP (Q,D, Rh,R) is superposed on male coarse structure GP1 whereas female coarse structure GM1 has no fine structure.

It will be noted that the depicted embodiments only represent a small fraction of all possible shapes both of the coarse structures and of the fine structures. Based thereon, a very large number of different structures can be produced which may e.g. consist of few separate logos or logotypes or the like on which a fine structure may be superposed. In addition thereto, a microstructure may be superposed in a known manner in order to produce e.g. authentication features or other distinctive features that are generally invisible to the naked eye.

FIGS. 17-20B schematically show some possibilities of how the female structure may differ from the male structure. For a better representation and visualization, the surface structures are shown as being tooth-shaped and enlarged so as to illustrate the deviations more clearly.

First, in order to be able to indicate the voluntary deviations, the errors, i.e. the manufacturing tolerances have to be specified. As previously mentioned, one goal of the improvements in the roller manufacture among others is to produce more precise and suitable structures for fine embossing, and thus the problem of achieving small manufacturing tolerances arises. These tolerances are also influenced inter alia by the surface quality of the rollers and it is therefore advantageous to use a hard surface. Thus, the rollers may be full hard metal rollers or metal rollers provided with a hard metal surface, or full ceramic rollers or metal rollers provided with a ceramic surface. All of these materials are particularly suitable for fine machining by means of a laser system. In most cases it is advantageous to provide the surface of the embossing rollers with a suitable protective layer.

For example, for the intended machining by means of a laser system, in the case of an embossing roller having a length of 150 mm and a diameter of 70 mm, errors of 2-4 µm in the direction of rotation and of +/−2 µm in the axial direction would be desirable and in height, for a tooth height of 0.1 mm, an error of 0.5 to 3 µm. For two opposed tooth flanks forming an angle of e.g. 80°, an angular error of less than 3° is desirable. Thus, for new rollers, a maximum linear error of +/−5 µm results, so that the manufacturing deviations may attain approx. 10 µm.

Since these values are strongly influenced by the measurements and the manufacture, however, only a linear deviation of the male structures from the female structures of 15 µm and more and an angular deviation of 4° and more can be qualified as a voluntary difference. The upper limit of the difference of the structures is set by the condition that the cooperation of the two rollers may not be impaired.

The voluntary difference between the respective associated structures on the male roller and those on the female roller is strongly dependent upon the material being embossed. Thus, for example, the linear difference for embossing a foil having a thickness of about 30 µm is around 40 μm and for embossing cardstock having a thickness of about 300 μm around 120 μm.

In FIGS. 17-20B it is illustrated that it is advantageous for certain structures if the rollers are arranged at a certain constant distance from each other. For a pin-up/pin-up roller system, such a constant spacing in the form of a depression on one of the rollers, i.e. of a reduction in diameter at least on the width of the foil, by 0.02 to 0.2 mm is described in WO 2011/161002 A1 to the applicant of the present invention.

In the cases according to FIGS. 17-20B, the diameter of one of the rollers, advantageously of the male roller, is reduced at least on the width of the foil by an amount of over 0.02 mm relative to the remainder of the roller. In this manner a more uniform embossing can be produced. In FIGS. 17-20B this depression or reduced diameter of the male rollers is denoted by an 'S'.

Alternatively, instead of a depression, other spacing means may be provided, e.g. an electronic or mechanical spacing control.

Figure 17:
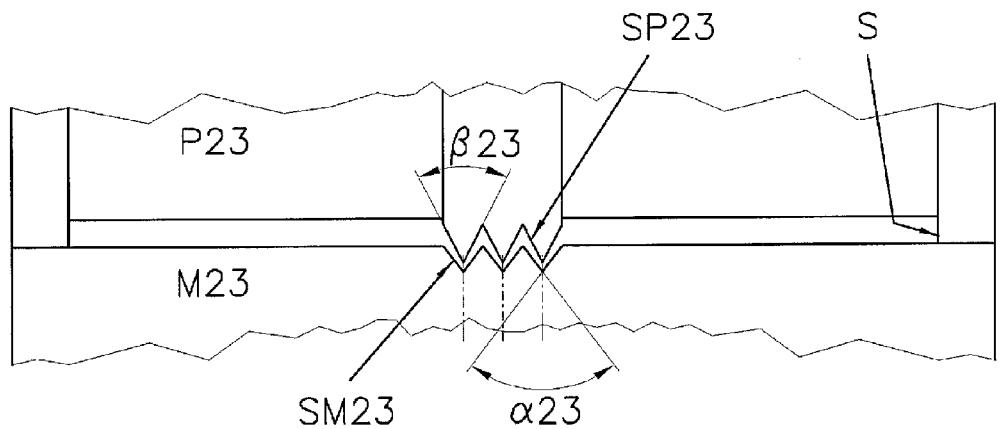

According to FIG. 17, female roller M23 has a surface structure SM23 where two opposed flanks of the indentations form an angle α23 and the male roller P23 has a structure SP23 where two opposed flanks of the teeth include and angle β23 and β23 is smaller than α23. These angles may have a value of 10° to 110° and a difference of more than 4°.

Figure 18:
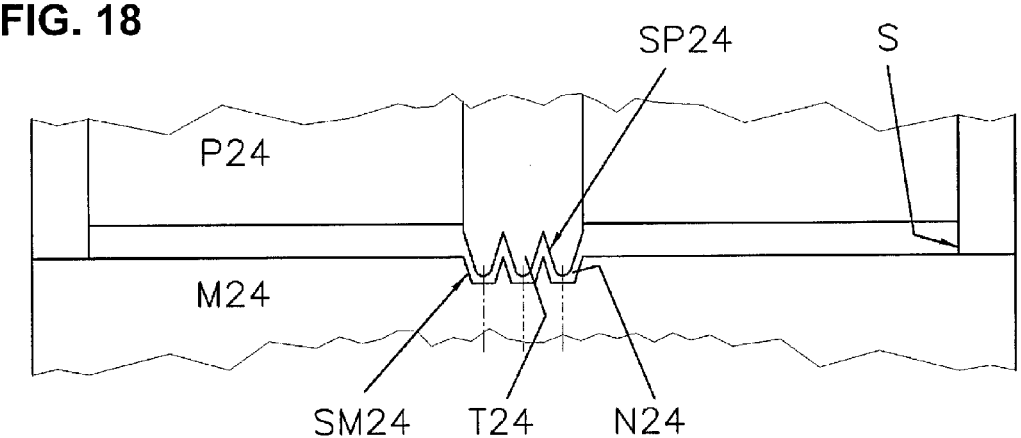

Female roller M24 in FIG. 18 has a female structure SM24 whose grooves N24 have a plane groove bottom. Male roller P24 has a surface structure SP24 whose teeth T24 are rounded.

Figure 19:
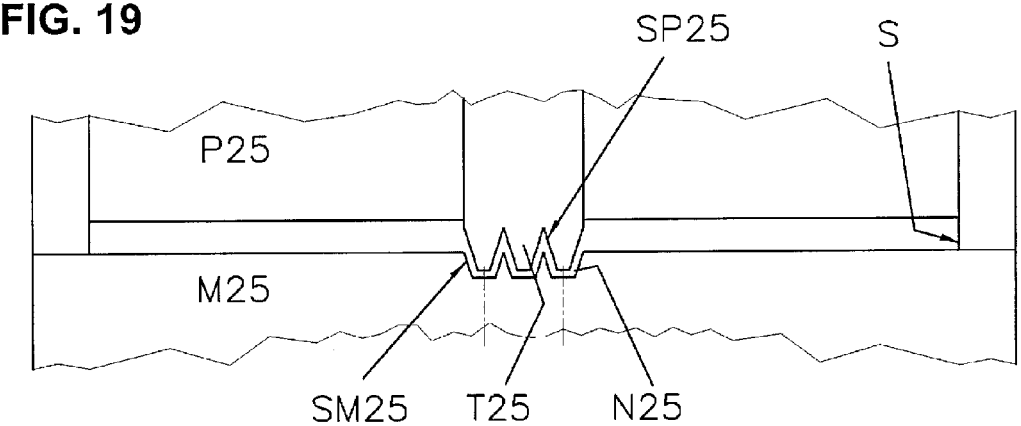

Female roller M25 in FIG. 19 has the same surface structure SM24 as previously whereas the teeth T25 of male roller P25 have flattened tips.

Figure 20:
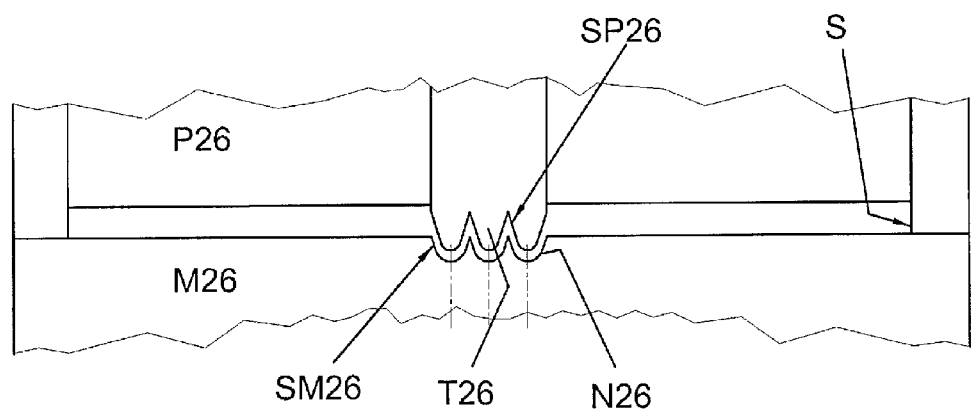

FIG. 20 shows a further embodiment variant where female roller M26 has a surface structure SM26 with rounded grooves N26 while teeth T26 in the surface structure SP26 of male roller P26 are also rounded but have a smaller radius than grooves N26.

Figure 20A:
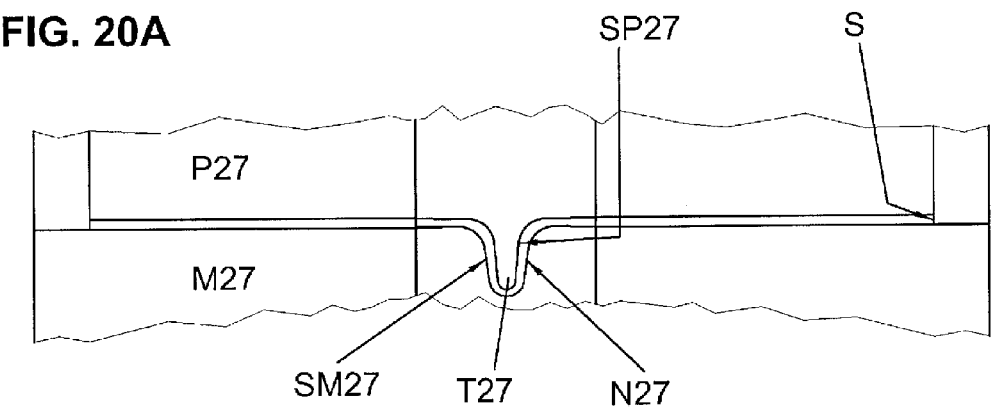

FIG. 20A shows a further embodiment variant where female roller M27 has a surface structure SM27 with a rounded groove N27 while key T27 in surface structure SP27 of male roller P27 is also rounded but has a smaller radius than groove N27.

Figure 20B:
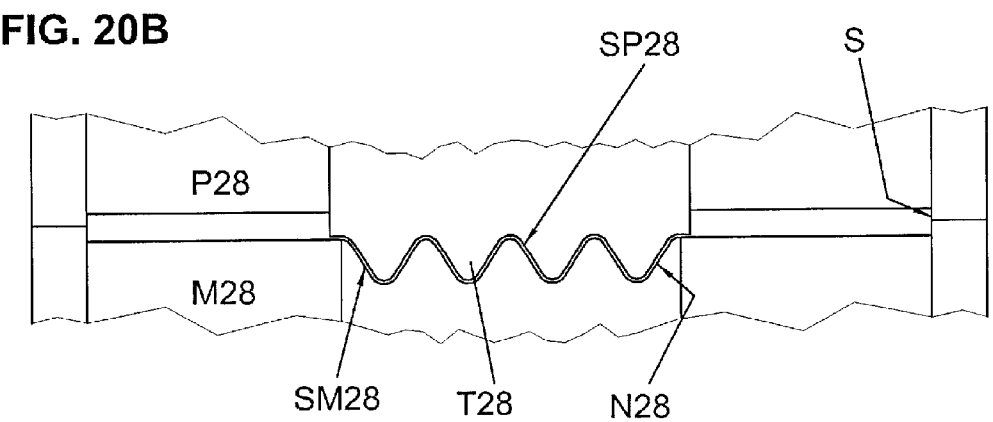

FIG. 20B shows a further embodiment variant where female roller M28 has a surface structure SM28 with rounded grooves N28 while the teeth T28 in surface structure SP28 of male roller P28 are also rounded but have a smaller radius than grooves N28.

The embodiment variants according to FIGS. 21 to 35 have also been produced according to the principle that the female structures are not exactly inversely congruent to the male structures. These variants refer to roller pairs including zones for creating creasings. The creasings may serve decorative purposes too. Such creasings are advantageous in cases where it is difficult to wrap the foil around objects such as tobacco products without interfering with the on-line packaging process.

In FIGS. 21 to 35, respective devices 80 having a roller pair 81P and 81M are illustrated where male roller 81P is driven by drive 6 and synchronized to the female roller by means of gearwheels 39, 40. All rollers in the depicted exemplary embodiments have a basic structure consisting e.g. of triangles TP or TM and a number of creasing zones 82, e.g. four, which may exhibit different structures having a decorative effect also.

Figure 21:
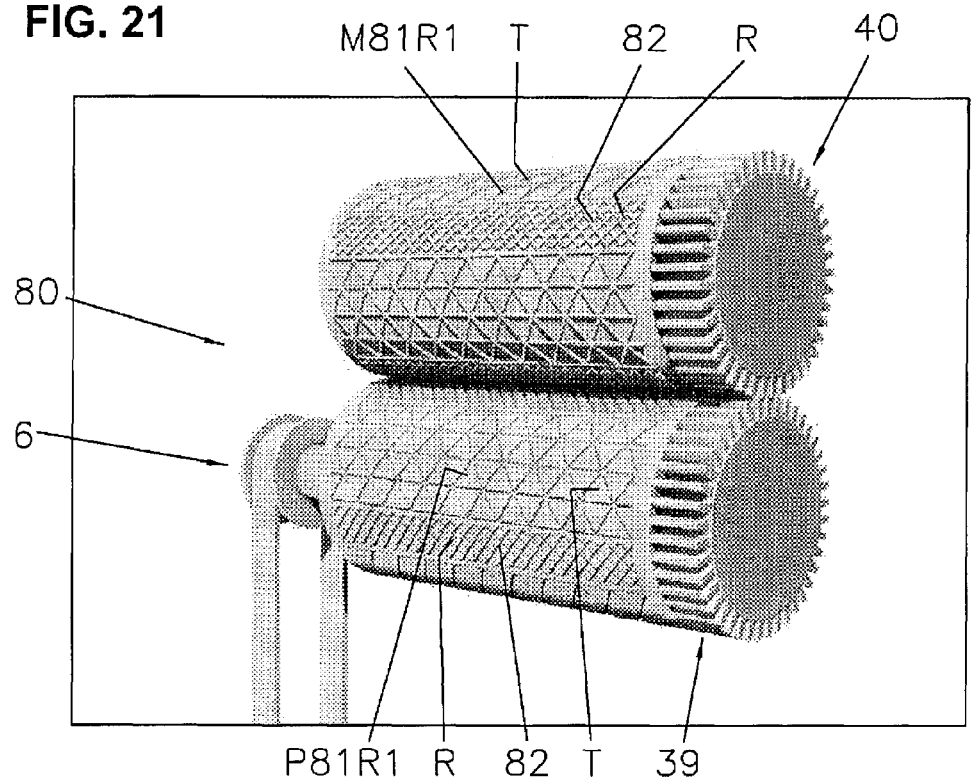

Thus, the creasing zones of roller pair P81R1 and M81R1 of FIG. 21 have a grid structure R where the grids of the male roller are raised and those of the female roller are recessed. In order to serve as creasings, these structures are generally more raised and recessed, respectively, than the triangle structures. This applies to all depicted creasing structures.

Figure 22:
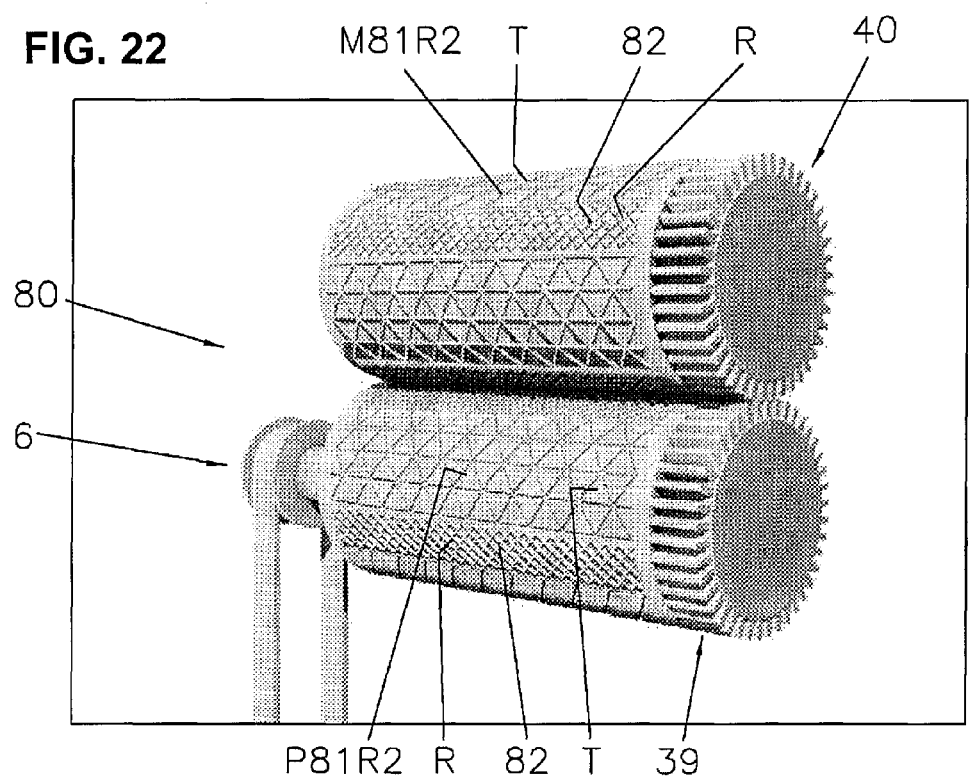

Inversely, the creasing zones of roller pair P81R2 and M81R2 of FIG. 22 have recessed grid structures on the male roller and raised grid structures on the female roller.

Figure 23:
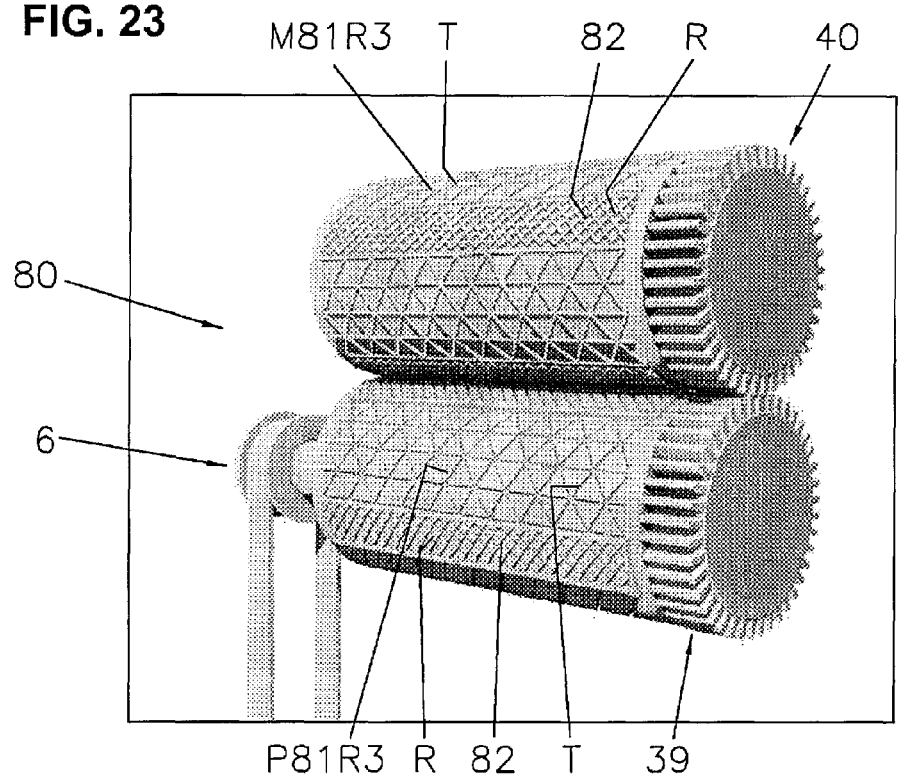

The grid structures of the creasing zones of P81R3, M81R3 of FIG. 23 correspond to those of FIG. 21 with the difference that the creasing zones do not extend up to the edges of the rollers.

Figure 24:
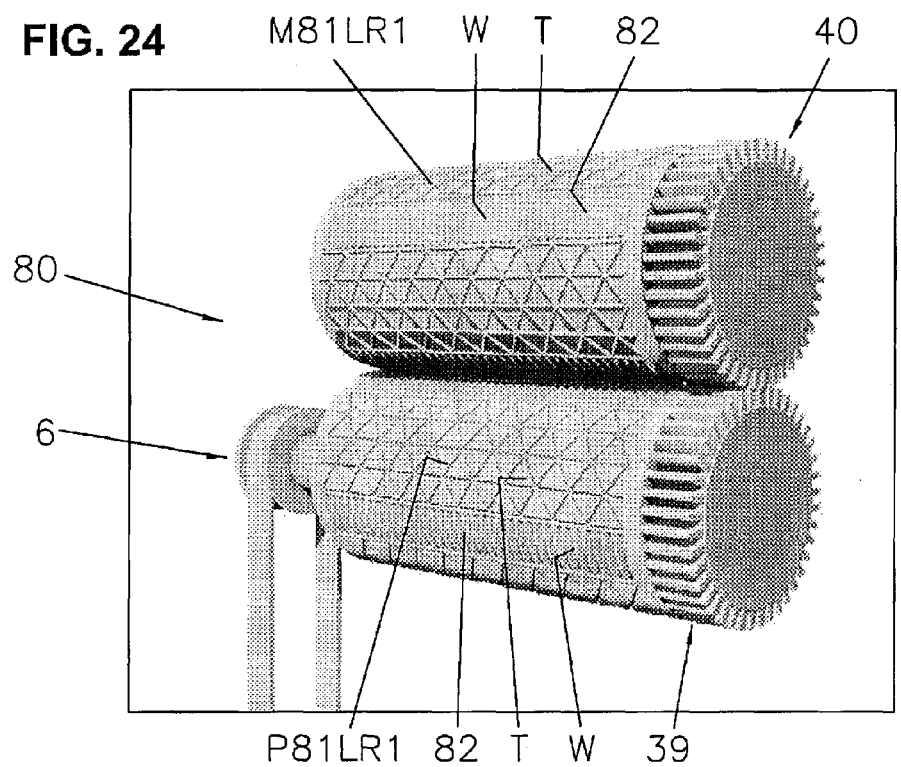
Figure 25:
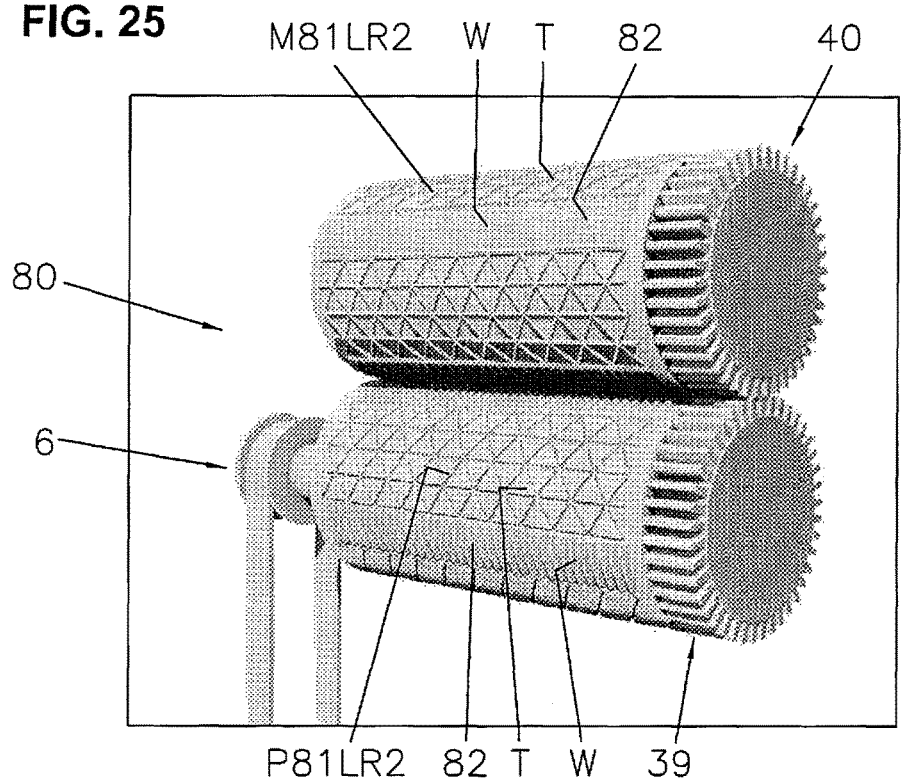
Figure 26:
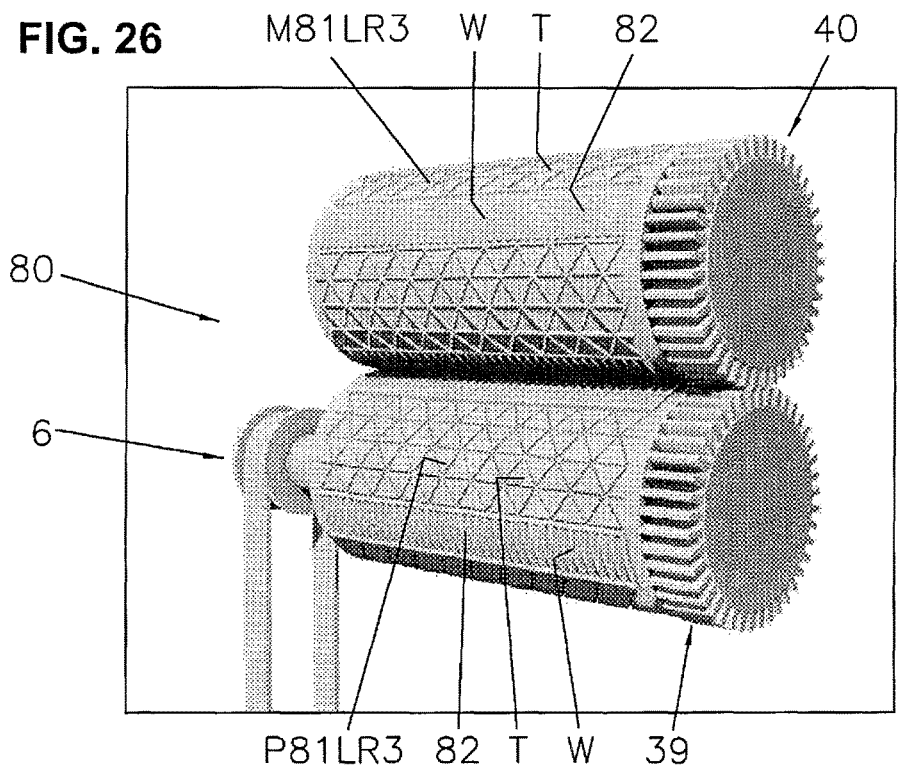

The creasing zones of roller pairs P81LR1-3 and M81LR1-3 of FIGS. 24-26 include radially arranged ridges W projecting either from the male roller or from the female roller, with corresponding indentations on the female or male roller. The creasing zones on roller pair P81LR3 and M81LR3 are shorter than the length of the rollers.

Figure 27:
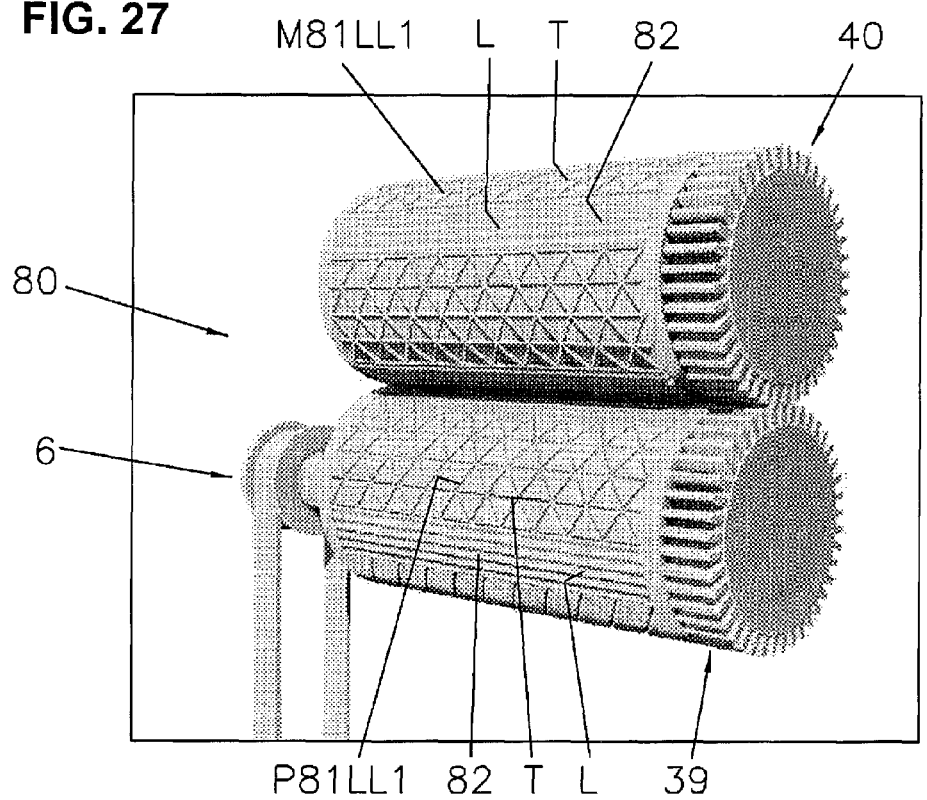
Figure 28:
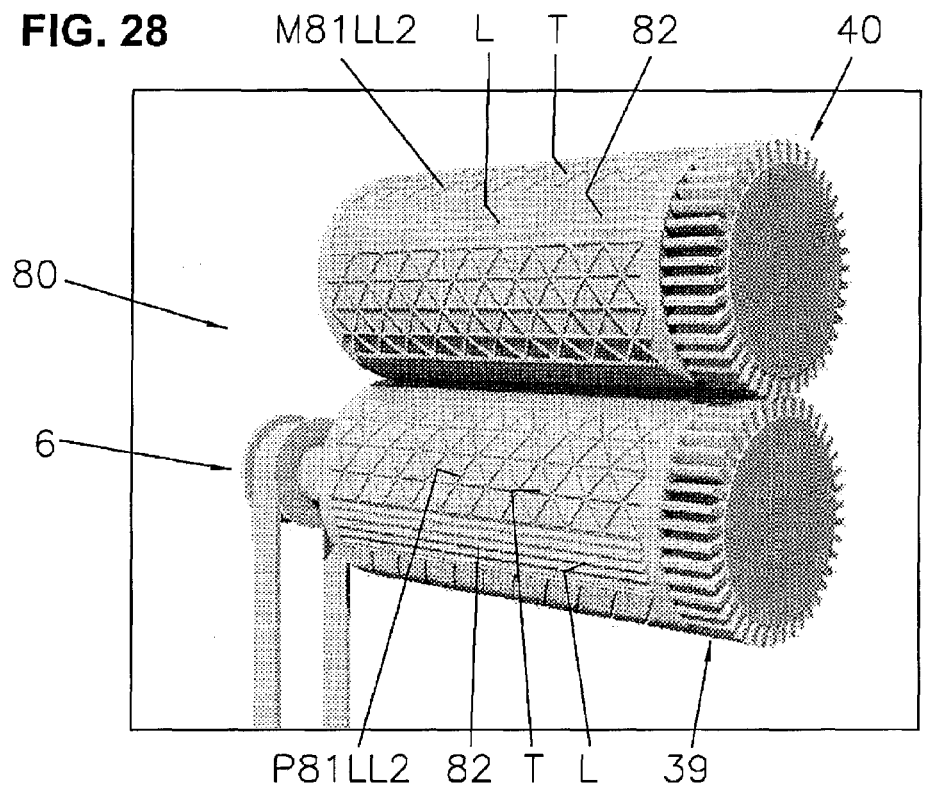
Figure 29:
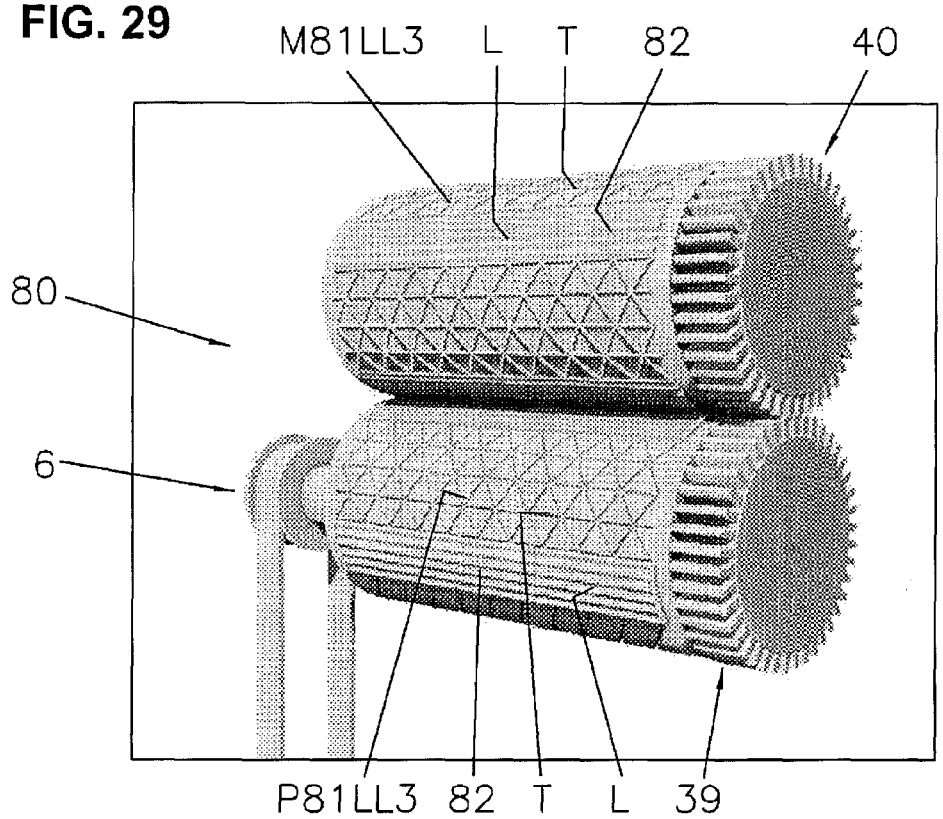

The creasing zones of roller pairs P81LL1-3 and M81LL1-3 of FIGS. 27-29 include longitudinally arranged ridges L projecting either from the male roller or from the female roller, with corresponding indentations on the female or male roller. The creasing zones on roller pair P81LL3 and M81LL3 are shorter than the length of the rollers.

Figure 30:
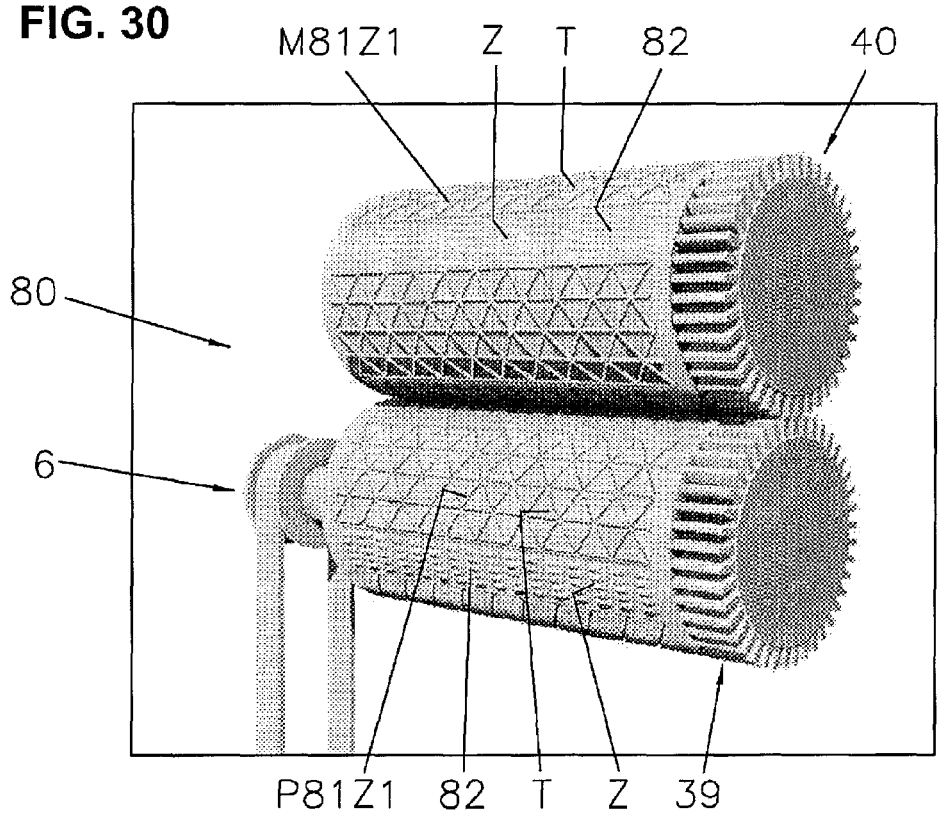
Figure 31:
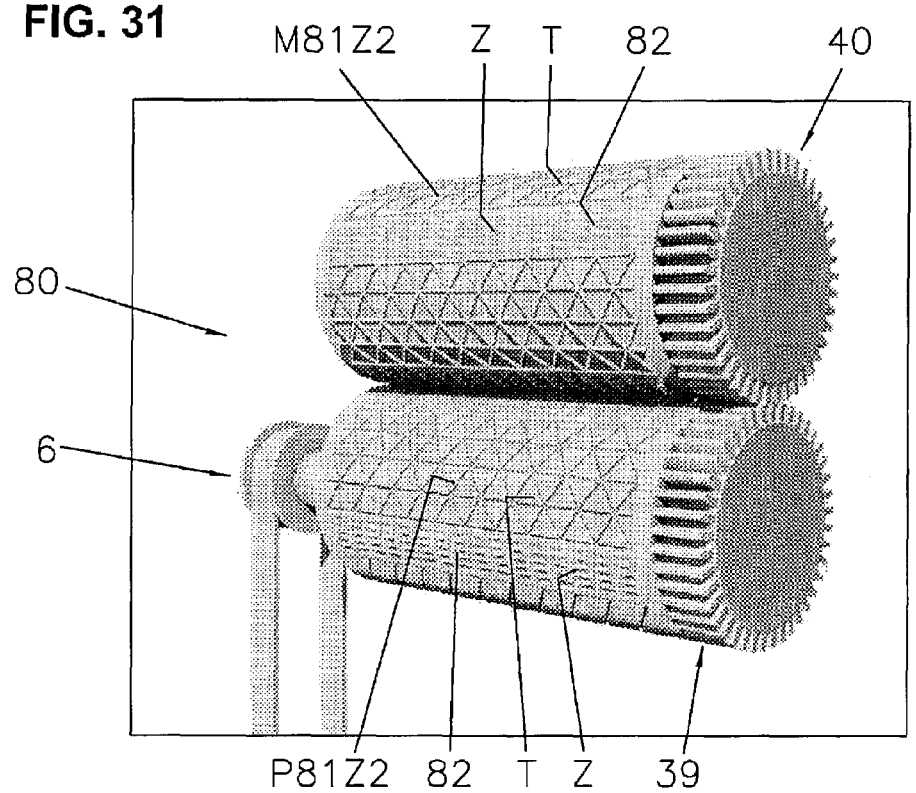
Figure 32:
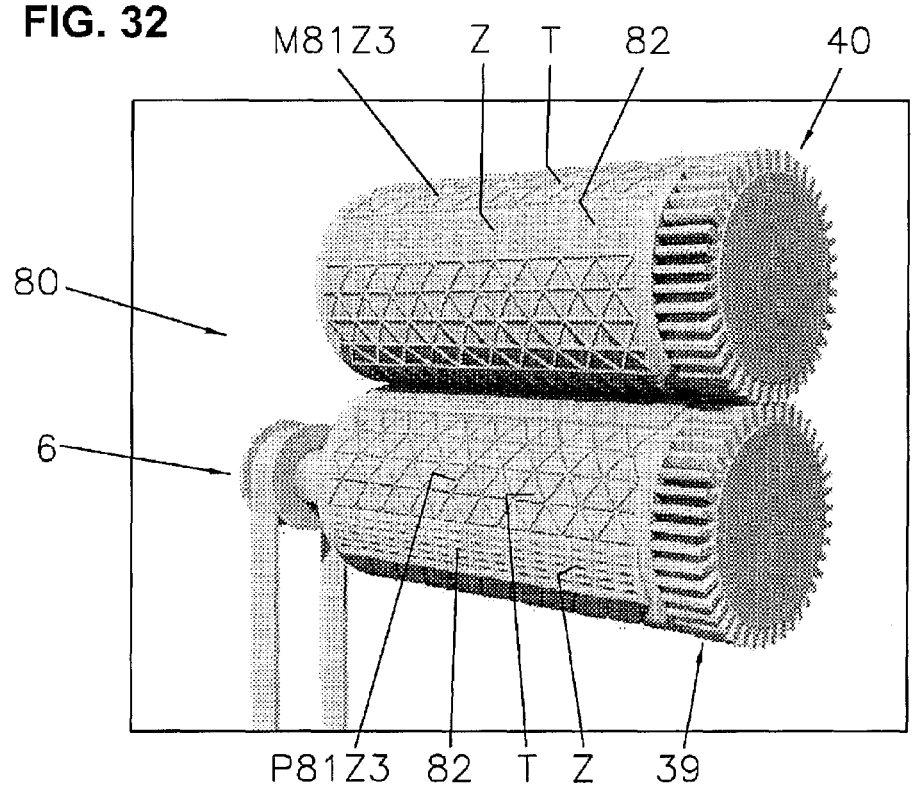

The creasing zones of roller pairs P81Z1-3 and M81Z1-3 of FIGS. 30-32 include teeth Z projecting either from the male roller or from the female roller, with corresponding indentations on the female or male roller. The creasing zones on roller pair P81Z3 and M81Z3 are shorter than the length of the rollers.

Figure 33:
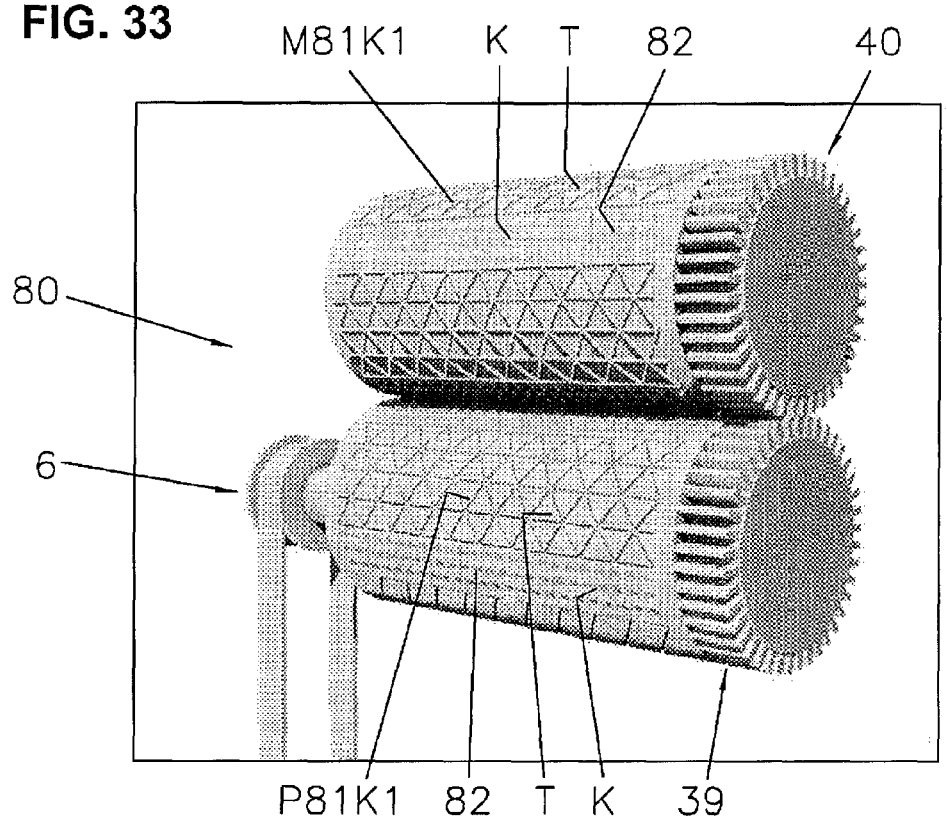
Figure 34:
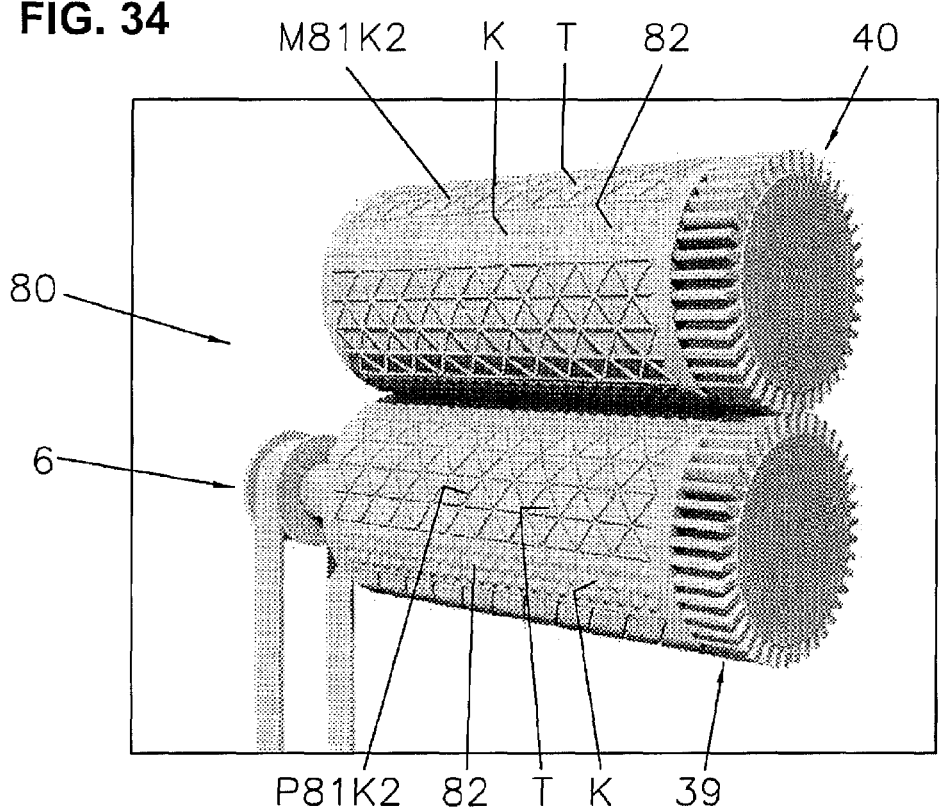
Figure 35:
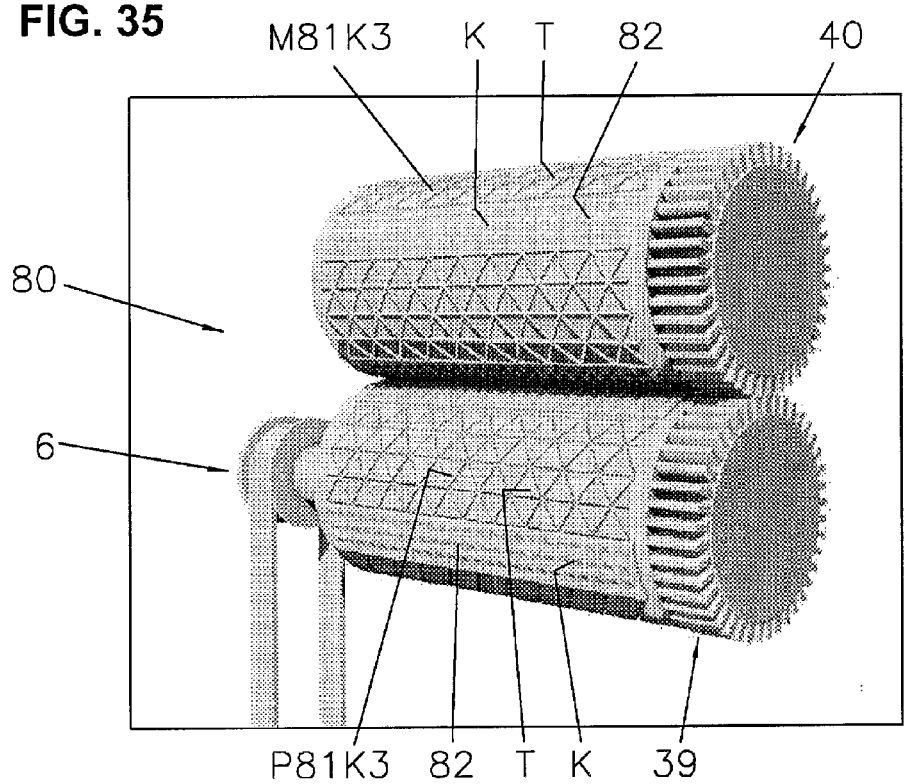

The creasing zones of roller pairs P81K1-3 and M81K1-3 of FIGS. 33-35 include teeth K having a round cross-section and tapering conically toward their tips, and projecting either from the male roller or from the female roller, with corresponding indentations on the female or male roller. The creasing zones on roller pair P81K3 and M81K3 are shorter than the length of the rollers.

From the schematically illustrated FIGS. 17-20B it follows that due to the fact that the structures of the female rollers are not inversely congruent to the structures of the male rollers, i.e. that the dimensions and also the shapes of the structures of the male roller and the associated structures of the female roller are different from each other, a reduced crushing of the foil between the two rollers results, thereby strongly reducing or entirely eliminating any distortion of the embossed foil in the transverse direction in a number of embossing types.

This offers the significant advantage that in spite of the required high pressures between the rollers a perforation of the foil is avoided and its subsequent processing in a packing line is facilitated. Only thus it is possible to use such rollers analogously to the known and frequently used pin-up/pin-up rollers in an on-line process in a packing line. In the case of the embossing of tippings or of structures arranged in webs, it is advantageous to mutually offset the structural elements on the two webs.

The male-female rollers of the prior art were always manufactured in pairs, and due to the fact that the female rollers were shaped inversely congruent to the male rollers, each time one of the rollers had to be replaced, it was inevitable to replace the other roller too. With the method according to the invention, which allows an individual manufacture, it is possible to exchange either the male roller or the female roller separately, which is an important advantage not only on account of the differences in wear behavior but also with regard to the design possibilities.

Quick-change devices for the usual pin-up/pin-up rollers are known from U.S. Pat. No. 6,665,998 to the applicant of the present invention and have been used in the majority of all cigarette paper embossing devices worldwide ever since. In these devices, the axle of the counter-roller is movable in all three coordinate directions in order to allow a self-synchronization of the embossing rollers.

Figure 36:
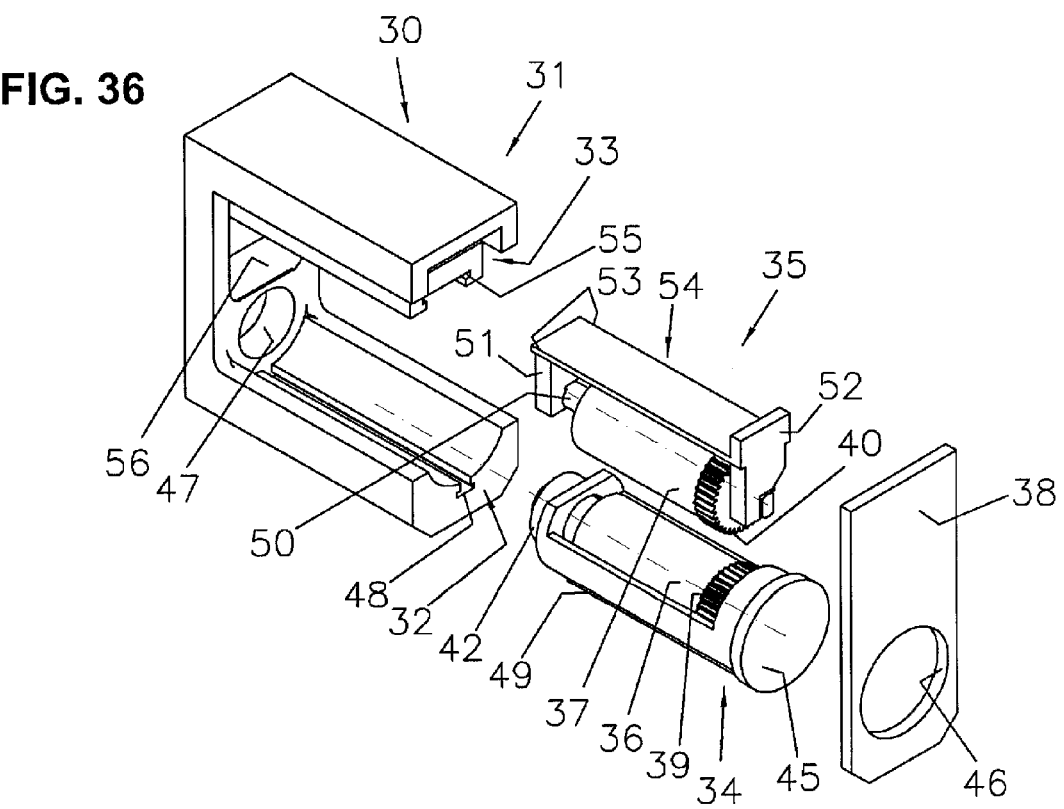
Figure 37:
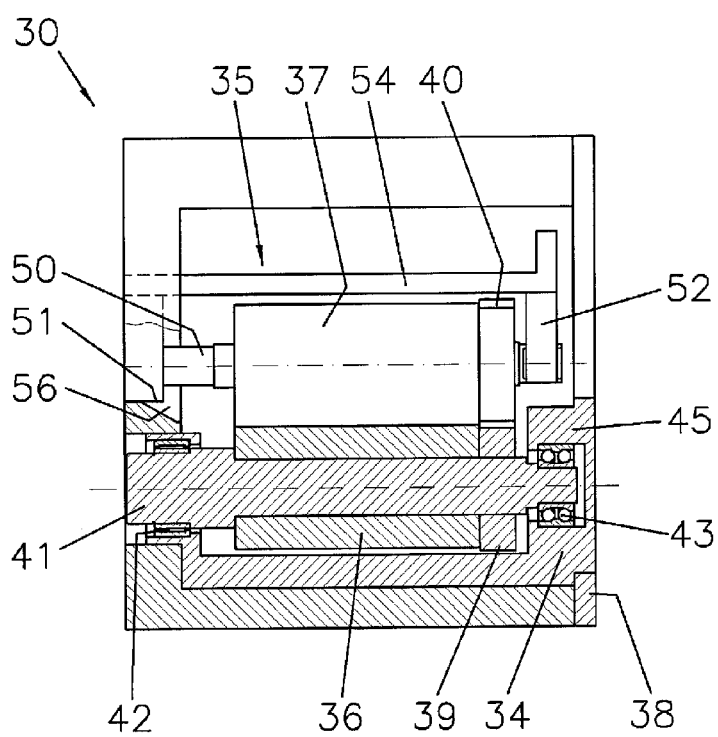

The quick-change device 30 of FIGS. 36 and 37 comprises a housing 31 having two seats 32 and 33 intended to receive respective roller supports 34 and 35. Roller support 34 serves for mounting the male roller 36 that is driven by the non-represented drive 6, and roller support 35 serves for mounting the female roller 37. According to FIG. 20, roller support 34 is inserted into seat 32 and roller support 35 into seat 33. Housing 31 is closed by means of a closure plate 38.

In the present example, as in the examples according to FIGS. 3-8, the female roller is driven by the driven male roller 36 via gearwheels 39 and 40 located at one end of the rollers. In order to ensure the required high precision of the synchronization, the gearwheels are very fine. However, other synchronizing means, e.g. electric motors, may also be used.

In the sectional view of FIG. 37 it is visible that on the external drive side, on the left of the drawing, roller axle 41 of male roller 36 is rotatably supported in a needle bearing 42 in roller support 34 and on the other side in a ball bearing 43. The two ends 44 and 45 of the roller support are retained in corresponding openings 46 and 47 of the housing and of the closure plate, respectively. For a precise and unequivocal insertion and positioning of the roller support in the housing, the housing bottom has a T-shaped groove 48 to which a T-shaped key 49 on the bottom of the roller support corresponds.

On one side, on the left of the drawing, the roller axle 50 of female roller 37 is supported in a wall 51 of roller support 35, and on the other side in a second wall 52 of the roller support. The edges 53 of cover 54 of the roller support are shaped as keys that are insertable into the corresponding T-shaped groove 55 in housing 31, and one of the sidewalls 51 fits into a corresponding opening 56 in the housing wall.

The depicted versions where the second roller is driven via gearwheels require an adjustment of the rollers after mounting them in the roller support. This is e.g. achieved by means of the gearwheels.

Figure 38:
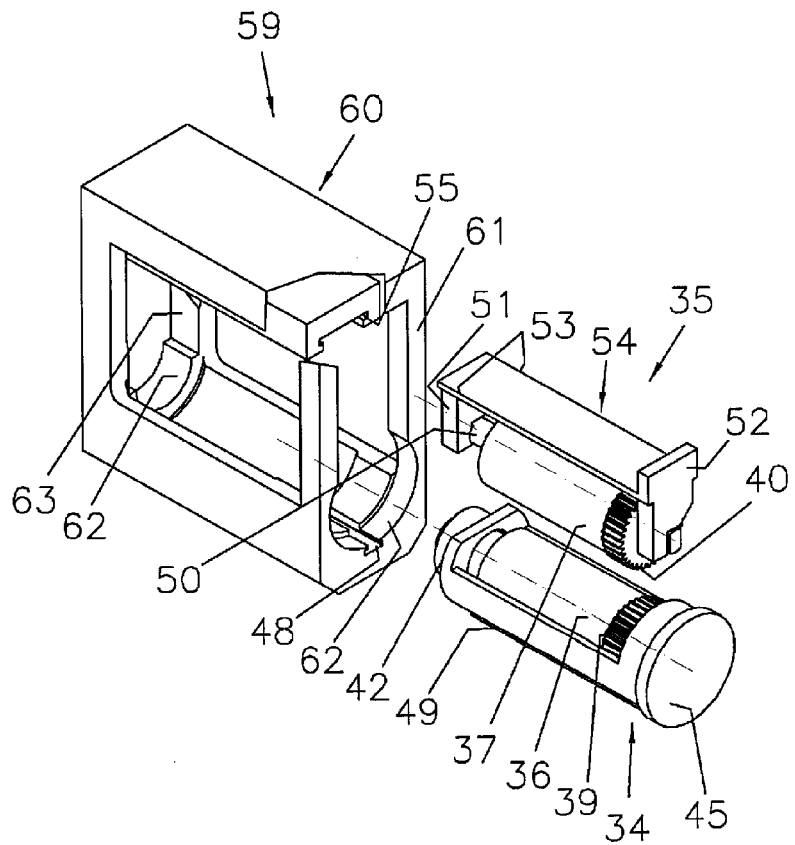

In the embodiment variant of the quick-change device 59 of FIG. 38, housing 60 does not have a closure plate but a wall 61 with a lower semicircular opening 62 and an upper approximately rectangular opening 63. The two rollers and the roller supports are the same as previously, and the T-shaped groove for receiving the female roller support and the T-shaped groove 48 in the housing bottom are also the same. The rear openings are similar to the forward openings 62 and 63 according to the drawing. In this embodiment also the roller supports are unequivocally and precisely fastened in the housing.

Figure 39:
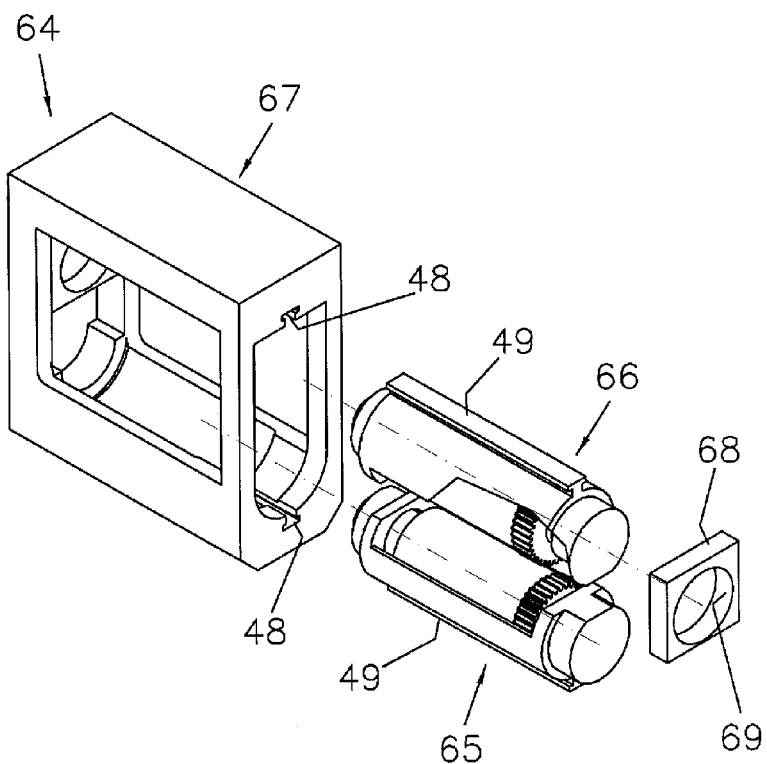

In the embodiment variant of FIG. 39, quick-change device 64 comprises two identical roller supports 65 and 66 having each a T-shaped key 49, one roller support 65 being guided and retained at the bottom and the other roller support 66 at the top of housing 67. The two roller supports are secured by means of a closure plate 68 having an opening 69 for receiving one roller end.

Figure 40:
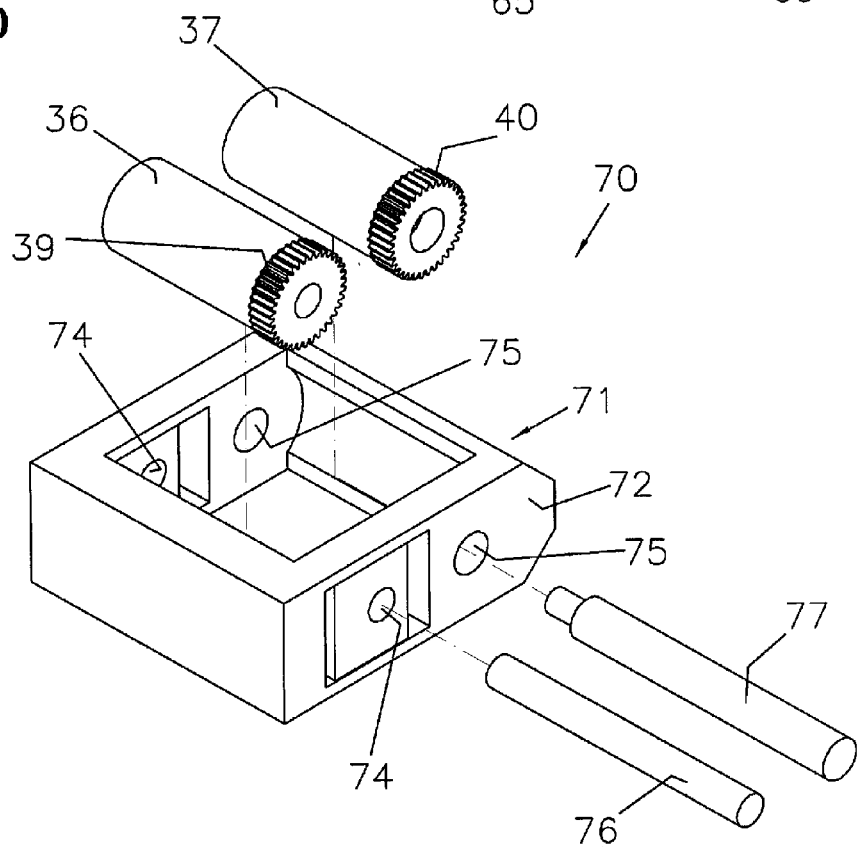

In the exemplary embodiment of FIG. 40, quick-change device 70 comprises a housing 71 having two opposed side walls 72, 73 in each of which two openings 74, 75 are arranged in order to receive the axles 76, 77 of the two embossing cylinders 36, 37 with gearwheels 39 and 40. In this strongly simplified schematic drawing it is visible that first the roller is inserted into the housing and then the axle is introduced and fastened. Furthermore it follows from this example that a quick exchange is also possible without roller supports.

The invention claimed is:

1. A method for manufacturing a set of embossing rollers for a device for embossing packaging materials that has two rollers, the set of embossing rollers comprising a male roller having a male surface structure including structural elements and/or logo structures and a female roller having a female surface structure that is associated to the surface structure of the male roller for the common embossing operation with the male roller, the set of embossing rollers designed for fine embossing in an on-line process, the method comprising:

producing the male roller having the male surface structure;

producing the associated female roller independently of the male roller, the female roller having the female surface structure including structural elements and/or logo structures, the steps of producing the male roller and the female roller include the steps of manufacturing contours of the male surface structure and the female surface structure with an overall linear error of less than +/−10 μm and an angular error of less than 4°, such that dimensions of the structural elements of the male roller and dimensions of the structural elements of the female roller deviate from one another by a pre-determined amount without impairing a cooperation between the male roller and the female roller, and manufacturing at least one of voluntary deviations of linear dimensions of the structural elements of the male roller and the structural elements of the female roller to be greater than 15 μm, and voluntary deviations of angular dimensions of angles of edges of the structural elements of the male roller and angles of edges of the structural elements of the female roller to be more than 4°.

2. The method according to claim 1, wherein producing the female surface structure comprises shaping the female surface structure such that embossed packaging material is provided with a tactually perceptible embossing pattern.

3. The method according to claim 2, wherein the tactually perceptible embossing pattern includes special signs such as Braille or acoustically utilizable signs.

4. The method according to claim 1, further comprising arranging and designing the logo structures of the male and female rollers such that during passage of a foil web between the male and female rollers, at least two sections can be embossed on the foil web in such a manner that the logo structures embossed on one section are offset relative to the respective logo structures on the other section in a running direction.

5. The method according to claim 1, further comprising producing raised positioning marks on one of the male roller and the female roller, and producing associated recessed positioning marks on the other of the male roller and the female roller.

6. The method according to claim 1, wherein the surface structures of the male roller and the surface structures of the female roller are produced by a femto- or a picosecond laser system.

7. The method according to claim 6, further comprising producing a coarse structure and a superposed fine structure on a surface of the male roller and the female roller.

8. The method according to claim 6, further comprising:
producing zones for creating creasings in the packaging materials by providing one of the male roller and the female roller with raised creasing structures and the other of the male roller and the female roller with associated recessed creasing structures.

9. The method according to claim 1, wherein the packaging material is suitable for packaging foods and pharmaceuticals, or is tipping paper, cigarette paper, innerliner or innerframe paper, hybrid paper, a synthetic foil, or paperboard or cardstock for packaging tobacco products.

10. An embossing roller set comprising a male roller including structural elements and an associated female roller including structural elements, the male roller and the female roller manufactured according to the method of claim 1, wherein
the structural elements of the male roller and the structural elements on the associated female roller are
not inversely congruent,
deviate by a defined amount of more than 15 µm linearly and 4° angularly, and
contours of the structural elements of the male roller and contours of the structural elements of the female roller exhibit an overall linear error of less than +/−10 µm and an angular error of less than 4°.

11. The embossing roller set according to claim 10, wherein at least a surface of the male and female rollers consists of metal, hard metal, or ceramics, and the surface is possibly provided with a protective layer.

12. The embossing roller set according to claim 10, wherein one of the male and female rollers is connected to the other embossing roller of the male and female rollers by synchronizing means.

13. The embossing roller set according to claim 10, wherein the male and female rollers are arranged at a determined mutual distance of more than 0.02 mm.

14. The embossing roller set according to claim 10, further comprising:
a quick-change device for arranging the male and female rollers individually and independently exchangeable of each other.

15. The embossing roller set according to claim 14, wherein the quick-change device is configured to rotatably retain the male and female rollers in respective roller supports and fastening the roller supports in unequivocal positions, the roller supports being individually and independently removable,
wherein one end of a male roller support is supported in a needle bearing and the other end of the male roller support is supported in a ball bearing.

16. The embossing roller set according to claim 14, wherein a lower part of one of the roller supports has a key and a bottom of a housing has a corresponding groove.

17. The embossing roller set according to claim 16, wherein an upper part of the other roller support has a key and a groove is arranged in an upper part of the housing, or edges of the upper part of the other roller form a T-shaped key and the upper side of the housing has a T-shaped groove.

18. The embossing roller set according to claim 15, wherein the quick-change device comprises a housing with two opposed walls each having two openings with fastening means for receiving and fastening axles of the male and female rollers.

19. The embossing roller set according to claim 10, wherein one of the male and female rollers is connected to the other of the male and female rollers by gearwheels.

20. The method according to claim 1, wherein producing the male and the female structures comprises
engraving the male roller to form the male surface structure by applying a short pulse laser with laser pulses between 10 femtoseconds and 100 picoseconds for cold ablation of surfaces of the male roller, and
engraving the female roller to form the female surface structure by applying the short pulse laser with laser pulses between 10 femtoseconds and 100 picoseconds for cold ablation of surfaces of the female roller.

21. The method according to claim 1, wherein producing the male roller having the male surface structure further comprises producing the male roller to have a diameter that is smaller than a diameter of the female roller by a predetermined amount, the predetermined amount being more than 0.02 mm at areas other than the male surface structure of the male roller and the female surface structure of the female roller.

22. The method according to claim 1, wherein the male surface structure and the female surface structure are each made of at least one of steel, hard metal, or ceramic material.

23. The embossing roller set according to claim 10, wherein the male surface structure and the female surface structure are each made of at least one of steel, hard metal, or ceramic material.

24. A method for manufacturing a set of embossing rollers for embossing packaging materials, the set of embossing rollers comprising a male roller having a male surface structure and an associated female roller having a female surface structure that is associated with the male surface structure of the male roller for an embossing operation with the male roller, the method comprising:
producing the male roller having the male surface structure;
producing the female roller having the female surface structure, the steps of producing the male roller and the associated female roller including the steps of
manufacturing contours of the male surface structure and the female surface structure with an overall linear error of less than +/−10 µm and an angular error of less than 4°, such that dimensions of the structural elements of the male roller and dimensions of the structural elements of the female roller deviate from one another by a pre-determined amount without impairing a cooperation between the male roller and the female roller, and
manufacturing at least one of
voluntary deviations of linear dimensions of the structural elements of the male roller and the structural elements of the female roller to be greater than 15 µm, and
voluntary deviations of angular dimensions of angles of edges of the structural elements of the male roller and angles of edges of the structural elements of the female roller to be more than 4°,
wherein the male surface structure and the female surface structure are each made of at least one of steel, hard metal, or ceramic material.

25. The method according to claim 24, wherein producing the male and female structures comprises
engraving the male roller to form the male surface structure by applying a short pulse laser with laser pulses between 10 femtoseconds and 100 picoseconds for cold ablation of surfaces of the male roller, and engraving the female roller to form the female surface structure by applying the short pulse laser with laser pulses between 10 femtoseconds and 100 picoseconds for cold ablation of surfaces of the female roller.

* * * * *